(12) United States Patent
Chen et al.

(10) Patent No.: US 10,230,481 B2
(45) Date of Patent: Mar. 12, 2019

(54) METHOD AND APPARATUS FOR BEARING FLEXIBLE ETHERNET SERVICE ON OPTICAL TRANSPORT NETWORK

(71) Applicant: Huawei Technologies Co., Ltd., Shenzhen (CN)

(72) Inventors: Yujie Chen, Shenzhen (CN); Qiuyou Wu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/905,199

(22) Filed: Feb. 26, 2018

(65) Prior Publication Data
US 2018/0183538 A1   Jun. 28, 2018

Related U.S. Application Data

(63) Continuation of application No. PCT/CN2016/093218, filed on Aug. 4, 2016.

(30) Foreign Application Priority Data

Nov. 23, 2015   (CN) .......................... 2015 1 0818776

(51) Int. Cl.
*H04J 14/00* (2006.01)
*H04J 3/16* (2006.01)
(Continued)

(52) U.S. Cl.
CPC .......... *H04J 3/1652* (2013.01); *H04J 3/1658* (2013.01); *H04L 12/403* (2013.01);
(Continued)

(58) Field of Classification Search
CPC ...... H04J 3/1652; H04J 3/1658; H04J 3/0602; H04J 2203/0085; H04J 2203/0094;
(Continued)

(56) References Cited

U.S. PATENT DOCUMENTS 5,991,308 A * 11/1999 Fuhrmann ........... H03M 13/256
370/395.53
8,295,310 B2 * 10/2012 Fourcand .............. H04J 3/0602
370/504
(Continued)

FOREIGN PATENT DOCUMENTS

CN        101022677 A    8/2007
CN        101141350 A    3/2008
(Continued)

OTHER PUBLICATIONS

Machine Translation and Abstract of Chinese Publication No. CN101022677, dated Aug. 22, 2007, 26 pages.
(Continued)

*Primary Examiner* — Hibret A Woldekidan
(74) *Attorney, Agent, or Firm* — Conley Rose, P.C.

(57) ABSTRACT

Embodiments of the present disclosure disclose a method and an apparatus for bearing a flexible Ethernet service on an optical transport network (OTN). The method includes extracting a flexible Ethernet service from a flexible Ethernet service layer; performing data division on the flexible Ethernet service to obtain at least two data queues, where each data queue carries a queue identifier; mapping each data queue into an OTN container, where the OTN container includes an optical channel data unit-k (ODUk) container or an optical channel data unit flexible container; and sending the OTN containers to an OTN. By using the embodiments of the present disclosure, bandwidth utilization can be improved, and network construction costs of an OTN can be reduced.

16 Claims, 15 Drawing Sheets

(51) Int. Cl.
*H04L 12/403* (2006.01)
*H04L 12/877* (2013.01)
*H04J 3/06* (2006.01)

(52) U.S. Cl.
CPC .......... *H04L 47/525* (2013.01); *H04J 3/0602* (2013.01); *H04J 2203/0085* (2013.01); *H04J 2203/0094* (2013.01)

(58) Field of Classification Search
CPC ............... H04J 14/0227; H04J 14/0273; H04J 2203/0053; H04J 2203/0067; H04J 14/0256; H04J 2203/0003; H04J 2203/0089; H04L 12/403; H04L 47/34; H04L 47/525; H04L 12/06; H04B 10/27; H04Q 11/0067; H04Q 2011/0064; H04Q 2011/0088; H04Q 11/00
USPC ...................... 398/90, 66, 67, 70–74, 77, 78
See application file for complete search history.

(56) References Cited

U.S. PATENT DOCUMENTS

| | | | | |
|---|---|---|---|---|
| 8,412,040 | B2* | 4/2013 | Valiveti | H04L 47/34 398/52 |
| 9,800,361 | B2* | 10/2017 | Gareau | H04J 3/1611 |
| 9,807,207 | B2* | 10/2017 | White | H04L 69/18 |
| 9,838,290 | B2* | 12/2017 | Gareau | H04L 43/10 |
| 9,924,248 | B2* | 3/2018 | Detwiler | H04B 10/27 |
| 2012/0251106 | A1 | 10/2012 | Valiveti et al. | |
| 2013/0121700 | A1 | 5/2013 | Dong et al. | |
| 2015/0055664 | A1 | 2/2015 | Kanonakis et al. | |
| 2016/0006657 | A1* | 1/2016 | Song | H04L 12/4641 370/254 |
| 2016/0028586 | A1* | 1/2016 | Blair | H04B 10/27 398/45 |
| 2016/0119076 | A1* | 4/2016 | Gareau | H04L 12/66 398/49 |
| 2016/0197743 | A1* | 7/2016 | Su | H04L 12/462 370/401 |
| 2017/0093757 | A1* | 3/2017 | Gareau | H04L 49/35 |
| 2017/0223438 | A1* | 8/2017 | Detwiler | H04Q 11/0067 |
| 2017/0324657 | A1* | 11/2017 | Zhong | H04L 1/00 |
| 2018/0041392 | A1* | 2/2018 | Blair | H04B 10/27 |
| 2018/0102834 | A1* | 4/2018 | Ibach | H04B 10/03 |
| 2018/0123714 | A1* | 5/2018 | Zhong | H04L 1/00 |
| 2018/0167160 | A1* | 6/2018 | Gareau | H04L 1/007 |

FOREIGN PATENT DOCUMENTS

| | | |
|---|---|---|
| CN | 102511171 A | 6/2012 |
| CN | 102739496 A | 10/2012 |
| CN | 103795605 A | 5/2014 |
| EP | 2512078 A1 | 10/2012 |
| EP | 2741454 A1 | 6/2014 |

OTHER PUBLICATIONS

Machine Translation and Abstract of Chinese Publication No. CN101141350, dated Mar. 12, 2008, 23 pages.
Machine Translation and Abstract of Chinese Publication No. CN103795605, dated May 14, 2014, 16 pages.
"Series G: Transmission Systems and Media, Digital Systems and Networks, Digital terminal equipments—General Series Y: Global Information Infrastructure, Internet Protocol Aspects and Next-Generation Networks, Internet protocol aspects—Transport, Interfaces for the Optical Transport Network (OTN)," ITU-T, G.709/Y. 1331, Dec. 2009, 218 pages.
Begin, C., et al : "FlexE Implementation Agreement—Initial Text Proposal," Contribution No. oif2015.127.01, IA OIF-FLEXE-01.0, Optical Internetworking Forum, Apr. 2015, 29 pages.
"IEEE Standard for Ethernet," IEEE Standards Association, IEEE Computer Society, IEEE Std 802.3, Part 1, Dec. 28, 2012, 634 pages.
"IEEE Standard for Ethernet," IEEE Standards Association, IEEE Computer Society, IEEE Std 802.3, Part 2, Dec. 28, 2012, 780 pages.
"IEEE Standard for Ethernet," IEEE Standards Association, IEEE Computer Society, IEEE Std 802.3, Part 3, Dec. 28, 2012, 358 pages.
"IEEE Standard for Ethernet," IEEE Standards Association, IEEE Computer Society, IEEE Std 802.3, Part 4, Dec. 28, 2012, 732 pages.
"IEEE Standard for Ethernet," IEEE Standards Association, IEEE Computer Society, IEEE Std 802.3, Part 5, Dec. 28, 2012, 844 pages.
"IEEE Standard for Ethernet," IEEE Standards Association, IEEE Computer Society, IEEE Std 802.3, Part 6, Dec. 28, 2012, 400 pages.
Foreign Communication From a Counterpart Application, PCT Application No. PCT/CN2016/093218, English Translation of International Search Report dated Oct. 27, 2016, 2 pages.
Foreign Communication From a Counterpart Application, Chinese Application No. 201510818776.9, Chinese Office Action dated Jan. 26, 2018, 7 pages.
Foreign Communication From a Counterpart Application, European Application No. 16867744.1, Extended European Search Report dated Jun. 15, 2018, 9 pages.

* cited by examiner

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| 0 | 0 | C | pc | Reserved | | | | | | | | | | | | | | | | | | | |
| 0 | 1 | C | | Client | | | | | #PHYs | | | | | | | | | | | | | | |
| 1 | 0 | C | | | | | | | | | | | | | | This PHY | | | | | | | |
| 1 | 1 | | | Reserved | | | | | | | | | | | | Management Channel | | | | | | | CRC-8 |

FIG. 2B

| PCS Lane 0 | 66b Block 3n | 66b Block 2n | AM 0 | 66b Block n | 66b Block 0 |
|---|---|---|---|---|---|
| PCS Lane 1 | 66b Block 3n+1 | 66b Block 2n+1 | AM 1 | 66b Block n+1 | 66b Block 1 |
| PCS Lane 2 | 66b Block 3n+2 | 66b Block 2n+2 | AM 2 | 66b Block n+2 | 66b Block 2 |
| PCS Lane n−1 | 66b Block 4n−1 | 66b Block 3n−1 | AM n−1 | 66b Block 2n−1 | 66b Block n−1 |

FIG. 2D

| 10 | 0 x 1e | 0 x 00 | 0 x 00 | 0 x 00 | 0 x 00 | 0 x 00 | 0 x 00 | 0 x 00 | 0 x 00 |

FIG. 2F

| Synchronization header | Type | Reserved | Service identifier | Total quantity of timeslots | This timeslot number | Delay alignment |
|---|---|---|---|---|---|---|
| 10 | 0 x C3 | 0 x 0 | 8 bits | 16 bits | 16 bits | 8 bits |

FIG. 2G

METHOD AND APPARATUS FOR BEARING FLEXIBLE ETHERNET SERVICE ON OPTICAL TRANSPORT NETWORK

CROSS-REFERENCE TO RELATED APPLICATIONS

This application is a continuation of International Application No. PCT/CN2016/093218, filed on Aug. 4, 2016, which claims priority to Chinese Patent Application No. 201510818776.9, filed on Nov. 23, 2015. The disclosures of the aforementioned applications are hereby incorporated by reference in their entireties.

TECHNICAL FIELD

The present disclosure relates to the field of communications technologies, and in particular, to a method and an apparatus for bearing a flexible Ethernet service on an optical transport network (OTN).

BACKGROUND

The 802.3-based Ethernet defined by the IEEE has been used as a service interface and applied to various scenarios. At present, the Optical Internetworking Forum (OIF) has been discussing to extend a conventional Ethernet application scenario, so as to support functions such as a subrate, channelization, and inverse multiplexing for an Ethernet service. Such an Ethernet technology is referred to as a Flex Ethernet (flexible Ethernet). For example, in a subrate application scenario for an Ethernet service, a 50G Ethernet service can be transported by using an existing 100GE Physical Medium Dependent (PMD) sublayer. In an inverse multiplexing scenario for an Ethernet service, a 200G Ethernet service can be transported by using two existing 100GE PMDs. In a channelization application scenario for an Ethernet service, the subrate technology and the inverse multiplexing technology are combined, and multiple standard Ethernet PMDs can be bound together by means of inverse multiplexing, to obtain a large-bandwidth Flex Ethernet service layer. The Flex Ethernet service layer bears multiple Flex Ethernet services. For example, one 250G Flex Ethernet service and five 10G Flex Ethernet services are transported at a 300G Flex Ethernet service layer, and the 300G Flex Ethernet service layer is generated by performing inverse multiplexing on three 100GE PMDs.

During conventional OTN network transmission, various Flex Ethernet services borne at a Flex Ethernet service layer have different destinations. Consequently, the Flex Ethernet service layer cannot be used as a whole for transmission. In a conventional technical solution, the Flex Ethernet services are identified, and the Flex Ethernet services are directly mapped into Optical Channel Data Unit-k (ODUk) containers or flexible Optical Channel Data Unit (ODUflex) containers for transmission. One Flex Ethernet service is corresponding to one ODUk/ODUflex container.

In the conventional technical solution, one Flex Ethernet service is mapped as a whole into one ODUk/ODUflex container. When a bandwidth of the Flex Ethernet service exceeds a bandwidth of a single line interface on a conventional OTN network, the bandwidth of the line interface should be upgraded, and end-to-end reconstruction needs to be performed on the conventional OTN network according to a service path. This causes a relatively high network construction cost of the OTN network. In addition, two 400G OTN line interfaces cannot be used to transport two 300G Flex Ethernet services and one 200G Flex Ethernet service. When the two 400G OTN line interfaces are used to transport the two 300G Flex Ethernet services respectively, the 200G Flex Ethernet service cannot be transported by using respective remaining 100G bandwidths of the two 400G OTN lines, and a third 400G OTN line needs to be established. This causes a waste of bandwidth resources.

SUMMARY

This application provides a method and an apparatus for bearing a flexible Ethernet service on an OTN, so as to improve bandwidth utilization, and reduce network construction costs of an OTN.

A first aspect provides a method for bearing a flexible Ethernet service on an OTN, including extracting, by a transmit end, a Flex Ethernet service from a Flex Ethernet service layer; performing, by the transmit end, data division on the Flex Ethernet service to obtain at least two data queues, where each data queue carries a queue identifier; mapping, by the transmit end, each data queue into an OTN container, where the OTN container includes an ODUk container or an ODUflex container; and sending, by the transmit end, the OTN containers to an OTN network.

In the foregoing technical solution, the transmit end extracts Flex Ethernet services from a Flex Ethernet service layer; perform data division on each Flex Ethernet service to obtain at least two data queues; map each data queue into an OTN container; and send the OTN containers to an OTN network. Each data queue carries a queue identifier, where the queue identifier is used to indicate a combination sequence for the data queues during data combination. For example, the queue identifier may be a service identifier-queue number. For example, if the transmit end divides the Flex Ethernet service into two data queues, and a service identifier of the Flex Ethernet service is 1, a queue identifier of a first data queue may be 1-1, and a queue identifier of a second data queue may be 1-2.

For example, the Flex Ethernet service layer bears two 300G Flex Ethernet services and one 200G Flex Ethernet service. After extracting a first 300G Flex Ethernet service from the Flex Ethernet service layer, the transmit end may divide the 300G Flex Ethernet service into 60 data queues, and map each data queue into an OTN container. Similarly, after extracting a second 300G Flex Ethernet service from the Flex Ethernet service layer, the transmit end may divide the 300G Flex Ethernet service into 60 data queues, and map each data queue into an OTN container. Similarly, after extracting the 200G Flex Ethernet service from the Flex Ethernet service layer, the transmit end may divide the 200G Flex Ethernet service into 40 data queues, and map each data queue into an OTN container. After mapping the data queues into the OTN containers respectively, the transmit end may transport, by using a first 400G OTN line interface, 60 OTN containers that bear the first 300G Flex Ethernet service and 20 OTN containers that bear the 200G Flex Ethernet service; and transport, by using a second 400G OTN line interface, 60 OTN containers that bear the second 300G Flex Ethernet service and the other 20 OTN containers that bear the 200G Flex Ethernet service. There is no need to upgrade a line interface bandwidth. In addition, each 400G OTN line interface is used to transport a 400G Flex Ethernet service, and a bandwidth resource of an OTN network is appropriately used. Therefore, the foregoing technical solution can be used to improve bandwidth utilization and reduce network construction costs of the OTN.

It should be noted that, in the foregoing technical solution, a transport manner for sending the OTN containers to the OTN network includes but is not limited to the foregoing manner. The OTN containers can be freely combined, and are transported by using different OTN line interfaces. For example, the 60 OTN containers that bear the first 300G Flex Ethernet service and 20 OTN containers that bear the second 300G Flex Ethernet service are transported by using the first 400G OTN line interface, other 40 OTN containers that bear the second 300G Flex Ethernet service and 40 OTN containers that bear the 200G Flex Ethernet service are transported by using the second 400G OTN line interface, or the like. Embodiments of the present disclosure do not specifically impose any limitation.

In an optional technical solution, after extracting the Flex Ethernet service from the Flex Ethernet service layer, the transmit end may insert an idle code block into the Flex Ethernet service every 20460 66B-code-blocks on average.

In a specific implementation manner, after the transmit end extracts the Flex Ethernet service from the Flex Ethernet service layer, a service layer overhead is deleted. For convenience of mapping circuit clock processing, the transmit end may insert an idle code block into the Flex Ethernet service every 20460 66B-code-blocks on average. Optionally, the transmit end may insert a first idle code block into the Flex Ethernet service at an interval of 20461 66B-code-blocks, and insert a second idle code block at an interval of 20459 66B-code-blocks starting from the inserted first idle code block. Further, a 66B-code-block is circularly inserted at the foregoing insertion interval. For example, a third idle code block is inserted at an interval of 20461 66B-code-blocks starting from the inserted second idle code block, a fourth idle code block is inserted at an interval of 20459 66B-code-blocks starting from the inserted third idle code block, and so on. Optionally, after the transmit end extracts the Flex Ethernet service from the Flex Ethernet service layer, the service layer overhead is deleted. There is a factor 20460/20461 between the Flex Ethernet service and an interface clock. That is, a bandwidth of each data queue decreases by 1/20461 to approximately 5.156G. After performing data division on the Flex Ethernet service to obtain the at least two data queues, the transmit end may insert an idle code block into each data queue every 20460 66B-code-blocks on average.

In the embodiments of the present disclosure, an idle code block is used to fill a Flex Ethernet service data stream whose service layer overhead and alignment marker (AM) character are deleted, so that the clock factor between a bandwidth of the Flex Ethernet service filled by the idle code block and the Flex Ethernet physical interface clock is simple, and processing by a clock processing module is facilitated.

In an optional technical solution, after the performing, by the transmit end, data division on the Flex Ethernet service to obtain at least two data queues, the method further includes performing timeslot grouping on the at least two data queues to obtain at least two groups of timeslot data queues, where each group of timeslot data queue includes at least one data queue; and performing interleaving on each group of timeslot data queue to obtain a data stream; where the mapping each data queue into an OTN container includes mapping each data stream obtained by means of interleaving into an OTN container.

For example, the transmit end performs data division on the Flex Ethernet service to obtain five data queues; performs timeslot grouping on the five data queues to obtain two groups of timeslot data queues, where a first group of timeslot data queue includes three data queues and a second group of timeslot data queue includes two data queues; performs interleaving on the three data queues in the first group of timeslot data queue to obtain a first data stream, and performs interleaving on the two data queues in the second group of timeslot data queue to obtain a second data stream; and maps the first data stream obtained by means of interleaving into an OTN container, and maps the second data stream obtained by means of interleaving into another OTN container. Compared with the technical solution of the first aspect in which five data queues need to be mapped into five OTN containers respectively, this technical solution can be used to improve data processing efficiency and reduce management load.

Optionally, after inserting an idle code block into the Flex Ethernet service every 20460 66B-code-blocks on average, the transmit end performs timeslot grouping on the at least two data queues to obtain at least one group of timeslot data queue; performs interleaving on each group of timeslot data queue to obtain a data stream; and maps each data stream obtained by means of interleaving into an OTN container.

A second aspect provides a method for bearing a flexible Ethernet service on an OTN, including extracting Flex Ethernet services from a Flex Ethernet service layer; dividing PMD channels into at least two virtually concatenated containers; mapping the Flex Ethernet services into the at least two virtually concatenated containers, where the virtually concatenated container includes an ODUk-Xv container or an ODUflex-Xv container; combining the at least two virtually concatenated containers into OTN containers, where a quantity of the OTN containers is the same as that of the PMD channels; and sending the OTN containers to an OTN network.

For example, the Flex Ethernet service layer bears two 300G Flex Ethernet services and one 200G Flex Ethernet service. After extracting the Flex Ethernet services from the Flex Ethernet service layer, the transmit end may divide two 400G PMD channels into 160 5G-virtually-concatenated-containers; map the two 300G Flex Ethernet services and the 200G Flex Ethernet service into the 160 5G-virtually-concatenated-containers; combine the 160 5G-virtually-concatenated-containers that carry the Flex Ethernet services into two OTN containers; transport the first OTN container by using a first 400G OTN line interface, and transport the second OTN container by using a second 400G OTN line interface. There is no need to upgrade a line interface bandwidth. In addition, each 400G OTN line interface is used to transport a 400G Flex Ethernet service, and a bandwidth resource of an OTN network is appropriately used. Therefore, the foregoing technical solution can be used to improve bandwidth utilization and reduce network construction costs of the OTN.

A third aspect provides a method for bearing a flexible Ethernet service on an OTN, including obtaining OTN containers from an OTN network, where the OTN container includes an ODUk container or an ODUflex container; obtaining data queues from the OTN containers; performing data combination on the data queues to obtain a Flex Ethernet service; mapping the Flex Ethernet service into a Flex Ethernet service layer; and receiving the Flex Ethernet service layer by using a Flex Ethernet interface.

An application scenario of the first aspect is upstream transmission (a transmit end sends a Flex Ethernet service to an OTN network). An application scenario of the third aspect is downstream transmission (a receive end receives the Flex Ethernet service from the OTN network). A process of processing the Flex Ethernet service in the third aspect is inverse to a process of processing the Flex Ethernet service in the first aspect. For details, reference may be made to the technical solution described in the first aspect.

A fourth aspect provides a method for bearing a flexible Ethernet service on an OTN, including obtaining OTN containers from an OTN network, where the OTN container includes an ODUk container or an ODUflex container; dividing the OTN containers into at least two virtually concatenated containers, where the virtually concatenated container includes an ODUk-Xv container or an ODUflex-Xv container; obtaining Flex Ethernet services from the at least two virtually concatenated containers; mapping the Flex Ethernet services into a Flex Ethernet service layer; and receiving the Flex Ethernet service layer by using a Flex Ethernet interface.

An application scenario of the second aspect is upstream transmission (a transmit end sends Flex Ethernet services to an OTN network). An application scenario of the fourth aspect is downstream transmission (a receive end receives the Flex Ethernet services from the OTN network). A process of processing the Flex Ethernet service in the fourth aspect is inverse to a process of processing the Flex Ethernet service in the second aspect. For details, reference may be made to the technical solution described in the second aspect.

A fifth aspect provides an apparatus for bearing a flexible Ethernet service on an OTN, where the apparatus may include a service extraction unit, a data division unit, a data mapping unit, and a container sending unit, and the apparatus can be configured to implement some or all of the steps with reference to the first aspect.

A sixth aspect provides a terminal device, including a processor and a memory, where the processor can be configured to implement some or all of the steps with reference to the first aspect.

A seventh aspect provides an apparatus for bearing a flexible Ethernet service on an OTN, where the apparatus may include a service extraction unit, a container division unit, a service mapping unit, a container combination unit, and a container sending unit, and the apparatus can be configured to implement some or all of the steps with reference to the second aspect.

An eighth aspect provides a terminal device, including a processor and a memory, where the processor can be configured to implement some or all of the steps with reference to the second aspect.

A ninth aspect provides an apparatus for bearing a flexible Ethernet service on an OTN, where the apparatus may include a container obtaining unit, a data obtaining unit, a data combination unit, a service mapping unit, and a service layer receiving unit, and the apparatus can be configured to implement some or all of the steps with reference to the third aspect.

A tenth aspect provides a terminal device, including a processor and a memory, where the processor can be configured to implement some or all of the steps with reference to the third aspect.

An eleventh aspect provides an apparatus for bearing a flexible Ethernet service on an OTN, where the apparatus may include a container obtaining unit, a container division unit, a service obtaining unit, a service mapping unit, and a service layer receiving unit, and the apparatus can be configured to implement some or all of the steps with reference to the fourth aspect.

A twelfth aspect provides a terminal device, including a processor and a memory, where the processor can be configured to implement some or all of the steps with reference to the fourth aspect.

A thirteenth aspect provides a system for bearing a flexible Ethernet service on an OTN, including a transmit end and a receive end, where the transmit end is configured to extract a Flex Ethernet service from a Flex Ethernet service layer; perform data division on the Flex Ethernet service to obtain at least two data queues; map each data queue into an OTN container, where the OTN container includes an ODUk container or an ODUflex container; and send the OTN containers to an OTN network; and the receive end is configured to obtain the OTN containers from the OTN network; obtain the data queues from the OTN containers; combine data on the data queues to obtain the Flex Ethernet service; map the Flex Ethernet service into the Flex Ethernet service layer; and receive the Flex Ethernet service layer by using a Flex Ethernet interface.

A fourteenth aspect provides a system for bearing a flexible Ethernet service on an OTN, including a transmit end and a receive end, where the transmit end is configured to extract Flex Ethernet services from a Flex Ethernet service layer; divide PMD channels into at least two virtually concatenated containers; map the Flex Ethernet services into the at least two virtually concatenated containers; combine the at least two virtually concatenated containers into OTN containers, where a quantity of the OTN containers is the same as that of the PMD channels; and send the OTN containers to an OTN; and the receive end is configured to obtain the OTN containers from the OTN network; divide the OTN containers into the at least two virtually concatenated containers; obtain the Flex Ethernet services from the at least two virtually concatenated containers; map the Flex Ethernet services into the Flex Ethernet service layer; and receive the Flex Ethernet service layer by using an Flex Ethernet interface.

BRIEF DESCRIPTION OF DRAWINGS

To describe the technical solutions in the embodiments of the present disclosure more clearly, the following briefly describes the accompanying drawings for describing the embodiments. The accompanying drawings in the following description show merely some embodiments of the present disclosure, and a person of ordinary skill in the art may still derive other drawings from these accompanying drawings without creative efforts.

FIG. 2B is a schematic diagram of a format of a service layer overhead according to an embodiment of the present disclosure;

FIG. 2D is a schematic diagram of a personal communications service (PCS) timeslot into which an AM character is inserted according to an embodiment of the present disclosure;

FIG. 2F is a schematic diagram of a format of an idle code block according to an embodiment of the present disclosure;

FIG. 2G is a schematic diagram of a format of a control code block according to an embodiment of the present disclosure;

DESCRIPTION OF EMBODIMENTS

The following clearly describes the technical solutions in the embodiments of the present disclosure with reference to the accompanying drawings in the embodiments of the present disclosure.

Figure 1:
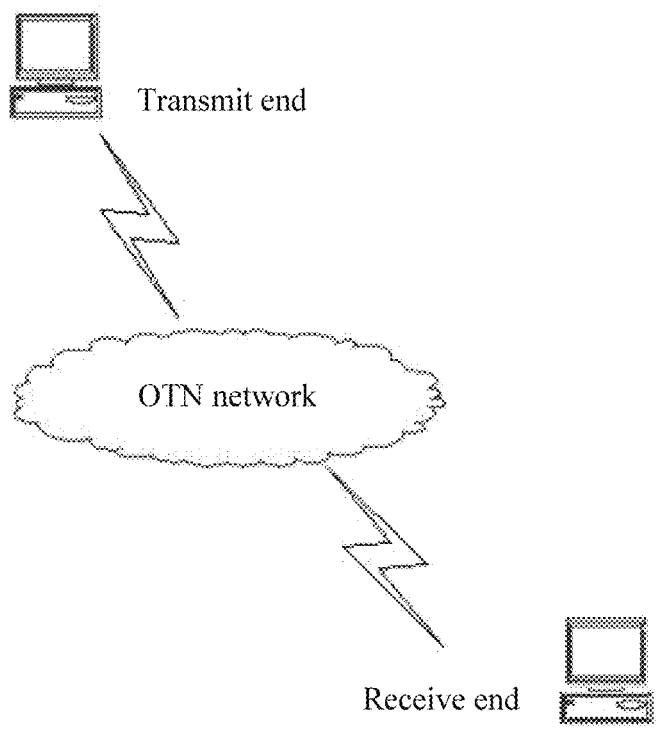
FIG. 1 is a schematic structural diagram of a system for bearing a Flex Ethernet service on an OTN according to an embodiment of the present disclosure.

Referring to FIG. 1, FIG. 1 is a schematic structural diagram of a system for bearing a flexible Ethernet service on an OTN according to an embodiment of the present disclosure. As shown in the figure, the system for bearing a flexible Ethernet service on an OTN in this embodiment of the present disclosure may include at least a transmit end and a receive end. The transmit end and the receive end can establish a communication connection by using an OTN network. The system for bearing a flexible Ethernet service on an OTN can implement upstream transmission and downstream transmission. The upstream transmission means that the transmit end sends a Flex Ethernet service to an OTN network. The downstream transmission means that the receive end receives the Flex Ethernet service from the OTN network.

During an upstream transmission process, the transmit end is configured to extract a Flex Ethernet service from a Flex Ethernet service layer; perform data division on the Flex Ethernet service to obtain at least two data queues; map each data queue into an OTN container, where the OTN container includes an ODUk container or an ODUflex container; and send the OTN containers to an OTN network.

During a downstream transmission process, the receive end is configured to obtain the OTN containers from the OTN network; obtain the data queues from the OTN containers; combine data on the data queues to obtain the Flex Ethernet service; map the Flex Ethernet service into the Flex Ethernet service layer; and receive the Flex Ethernet service layer by using a Flex Ethernet interface.

In the system for bearing a flexible Ethernet service on an OTN shown in FIG. 1, a transmit end extracts a Flex Ethernet service from a Flex Ethernet service layer; performs data division on the Flex Ethernet service to obtain at least two data queues; maps each data queue into an OTN container, where the OTN container includes an ODUk container or an ODUflex container; and sends the OTN containers to an OTN network. Further, a receive end obtains the OTN containers from the OTN network; obtains the data queues from the OTN containers; combines data on the data queues to obtain the Flex Ethernet service; maps the Flex Ethernet service into the Flex Ethernet service layer; and receives the Flex Ethernet service layer by using a Flex Ethernet interface. This can improve bandwidth utilization, and reduce network construction costs of an OTN.

Referring to FIG. 1, FIG. 1 is a schematic structural diagram of a system for bearing a flexible Ethernet service on an OTN according to an embodiment of the present disclosure. As shown in the figure, the system for bearing a flexible Ethernet service on an OTN in this embodiment of the present disclosure may include at least a transmit end and a receive end. The transmit end and the receive end can establish a communication connection by using an OTN network. The system for bearing a flexible Ethernet service on an OTN can implement upstream transmission and downstream transmission. The upstream transmission means that the transmit end sends a Flex Ethernet service to an OTN network. The downstream transmission means that the receive end receives the Flex Ethernet service from the OTN network.

During an upstream transmission process, the transmit end is configured to extract Flex Ethernet services from a Flex Ethernet service layer; divide PMD channels into at least two virtually concatenated containers; map the Flex Ethernet services into the at least two virtually concatenated containers; combine the at least two virtually concatenated containers into OTN containers, where a quantity of the OTN containers is the same as that of the PMD channels; and send the OTN containers to an OTN.

During a downstream transmission process, the receive end is configured to obtain the OTN containers from the OTN network; divide the OTN containers into the at least two virtually concatenated containers; obtain the Flex Ethernet services from the at least two virtually concatenated containers; map the Flex Ethernet services into the Flex Ethernet service layer; and receive the Flex Ethernet service layer by using an Flex Ethernet interface.

In the system for bearing a flexible Ethernet service on an OTN shown in FIG. 1, a transmit end extracts Flex Ethernet services from a Flex Ethernet service layer; divides PMD channels into at least two virtually concatenated containers; maps the Flex Ethernet services into the at least two virtually concatenated containers; combines the at least two virtually concatenated containers into OTN containers, where a quantity of the OTN containers is the same as that of the PMD channels; and sends the OTN containers to an OTN. Further, a receive end obtains the OTN containers from the OTN network; divides the OTN containers into the at least two virtually concatenated containers; obtains the Flex Ethernet services from the at least two virtually concatenated containers; maps the Flex Ethernet services into the Flex Ethernet service layer; and receives the Flex Ethernet service layer by using an Flex Ethernet interface. This can improve bandwidth utilization, and reduce network construction costs of an OTN.

Figure 3:
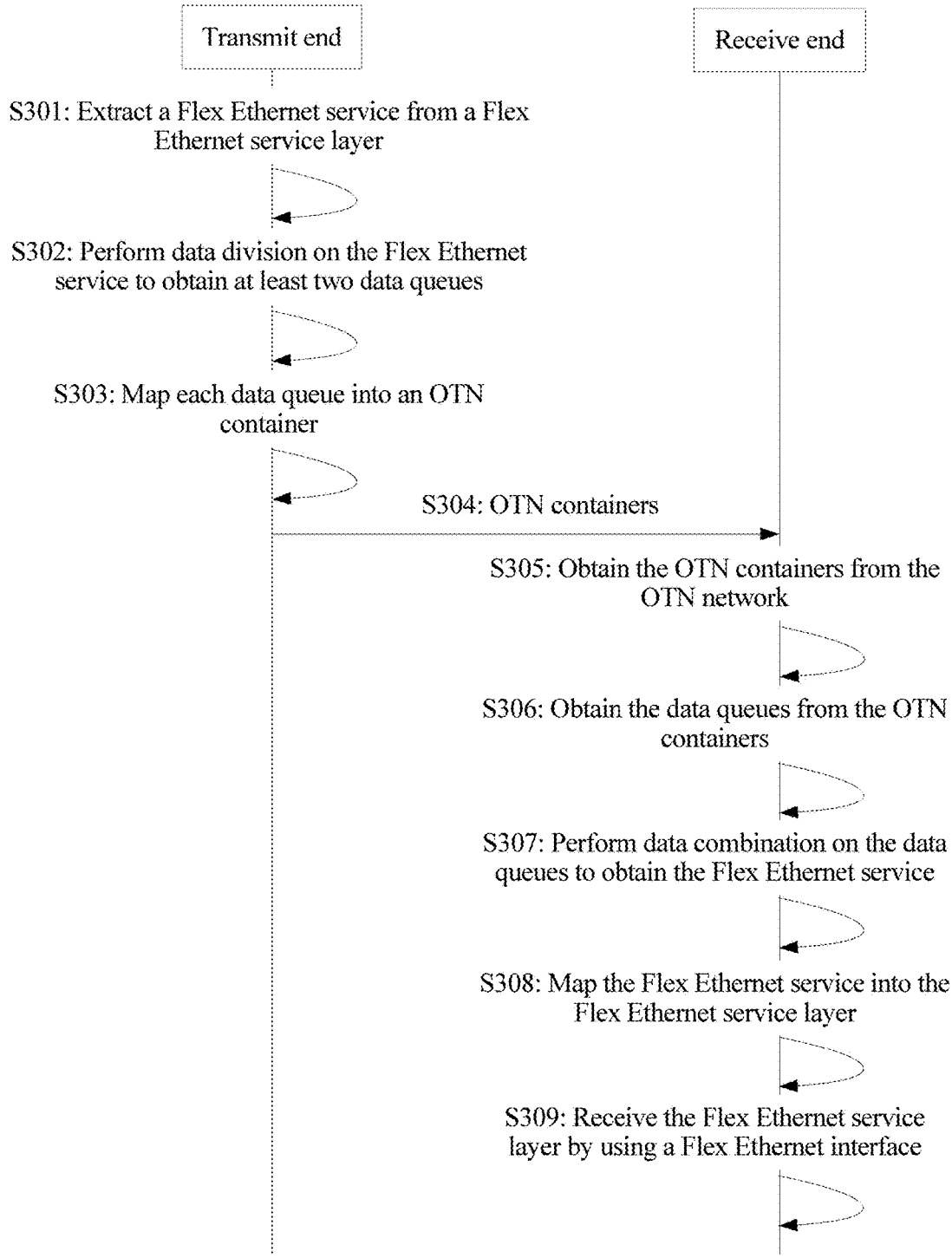
FIG. 3 is a schematic flowchart of a method for bearing a flexible Ethernet service on an OTN according to an embodiment of the present disclosure.

Referring to FIG. 3, FIG. 3 is a schematic flowchart of a method for bearing a flexible Ethernet service on an OTN according to an embodiment of the present disclosure. As shown in the figure, the method for bearing a flexible Ethernet service on an OTN in this embodiment of the present disclosure may include at least the following steps.

S301, a transmit end extracts a Flex Ethernet service from a Flex Ethernet service layer.

In specific implementation, the transmit end may extract the Flex Ethernet service from the Flex Ethernet service layer according to timeslot distribution of the Flex Ethernet service at the Flex Ethernet service layer. For example, each data queue in the Flex Ethernet service carries a queue identifier when being inserted into a frame structure of the Flex Ethernet service layer. For example, a queue identifier carried by a first data queue is 1-1, and a queue identifier carried by a second data queue is 1-2. The receive end may sequentially extract, from the frame data stream at the Flex Ethernet service layer, a data queue whose queue identifier is 1-1 and a data queue whose queue identifier is 1-2, and combine data on the two data queues to obtain the Flex Ethernet service.

Optionally, the Flex Ethernet service layer is distributed to a PCS timeslot by means of polling. Before extracting the Flex Ethernet service from the Flex Ethernet service layer, the transmit end may perform timeslot alignment on PCS logic lanes according to AM characters in the PCS logic lanes corresponding to each 100GE PMD, and delete the AM characters in the PCS logic lanes to obtain the Flex Ethernet service layer. Each PCS timeslot may be transmitted by using a corresponding PCS logic lane. For example, FIG. 2E shows a schematic diagram of extracting a Flex Ethernet service from a Flex Ethernet service layer. Each grid is corresponding to a 5G-timeslot. The transmit end may determine, according to the AM characters in the PCS timeslots, that all grids at the PCS lanes are aligned, that is, perform timeslot alignment on the PCS timeslots. The transmit end may delete the AM characters in the PCS timeslots, and combine the PCS timeslots whose AM characters are deleted, to obtain a frame data stream of the Flex Ethernet service layer.

Further, after deleting the AM characters in the PCS timeslots, the transmit end may perform, according to service layer overheads carried by the PCS timeslots, overhead alignment on the PCS timeslots whose AM characters are deleted, and extract the Flex Ethernet service from the PCS timeslots obtained by means of overhead alignment. For example, FIG. 2E shows a schematic diagram of extracting a Flex Ethernet service from a Flex Ethernet service layer. The transmit end may perform overhead alignment on the PCS timeslots whose AM characters are deleted. That is, the service layer overheads carried by the PCS lanes are longitudinally aligned. Then, the Flex Ethernet service is extracted from the PCS timeslots obtained by means of overhead alignment. For example, four 5G-timeslot data queues are extracted from a PCS timeslot of #1 PMD, and are 1.2, 1.5, 1.10, and 1.15 respectively. Four 5G-timeslot data queues are extracted from a PCS timeslot of #2 PMD, and are 2.1, 2.2, 2.4, and 2.6 respectively. Data combination is performed on the eight data queues according to a sequence shown in FIG. 2E, to obtain the Flex Ethernet service. In an example of 1.2, 1 in 1.2 represents a PMD number, and 2 in 1.2 represents occupying a second timeslot of 20 5G-timeslots of the #1PMD.

Optionally, after extracting the Flex Ethernet service from the Flex Ethernet service layer, the transmit end may insert an idle code block into the Flex Ethernet service every 20460 66B-code-blocks on average. A schematic diagram of a format of an idle code block may be shown in FIG. 2F. A bandwidth of an idle code block is 66B (66 bits).

S302, the transmit end performs data division on the Flex Ethernet service to obtain at least two data queues.

Optionally, after performing data division on the Flex Ethernet service to obtain the at least two data queues, the transmit end may insert a control code into each data queue every 16383 service data blocks. The control code is used to instruct to perform timeslot alignment on the data queue. A schematic structural diagram of a control code may be shown in FIG. 2G A bandwidth of a control code is 66B. A control type is customized to 0xC3. A service identifier is used to check whether services are a same Flex Ethernet service. The transmit end inserts, into all timeslots, a same value (where the value may be a random value, but values inserted into a same Flex Ethernet service should be the same), which is used for Flex Ethernet service combination check. A total quantity of timeslots is a quantity of 5G-timeslots occupied by the Flex Ethernet service. Numbers of the timeslots start from 0 in a natural sequence. A length of a delay alignment field is 8 bits, and the delay alignment works jointly with a control code cycle. A maximum achievable timeslot alignment capability is approximately 26.7 ms (16384*66/5.15625*255/2=26738688 ns).

Optionally, during an upstream transmission process, after performing data division on the Flex Ethernet service to obtain at least two data queues, the transmit end may perform timeslot grouping on the at least two data queues to obtain at least two groups of timeslot data queues, where each group of timeslot data queue includes at least two data queues; perform interleaving on each group of timeslot data queue to obtain a data stream; and map each data stream obtained by means of interleaving into an OTN container.

S303, the transmit end maps each data queue into an OTN container.

S304, the transmit end sends the OTN containers to an OTN network.

S305, a receive end obtains the OTN containers from the OTN network.

S306, the receive end obtains the data queues from the OTN containers.

Optionally, if the transmit end performs timeslot grouping on at least two data queues to obtain at least one group of timeslot data queue, performs interleaving on each group of timeslot data queue to obtain a data stream, and maps each data stream obtained by means of interleaving into an OTN container, the receive end may obtain, from the OTN containers, the data streams obtained by means of interleaving, perform de-interleaving on the data streams obtained by means of interleaving, to obtain the timeslot data queues, and obtain the data queues from the timeslot data queues.

Optionally, if the transmit end inserts a control code into each data queue every 16383 service data blocks, the receive end may perform timeslot alignment on the data queues according to the control codes carried by the data queues, and delete the control codes in the data queues to obtain the data queues.

S307, the receive end combines data on the data queues to obtain the Flex Ethernet service.

S308, the receive end maps the Flex Ethernet service into the Flex Ethernet service layer.

In specific implementation, the receive end may obtain a service layer overhead of the Flex Ethernet service layer, where the service layer overhead is used to instruct to perform timeslot allocation on a PCS that bears the Flex Ethernet service; and distribute, according to the service layer overhead, the Flex Ethernet service to an allocated PCS timeslot by means of polling.

Figure 2A:
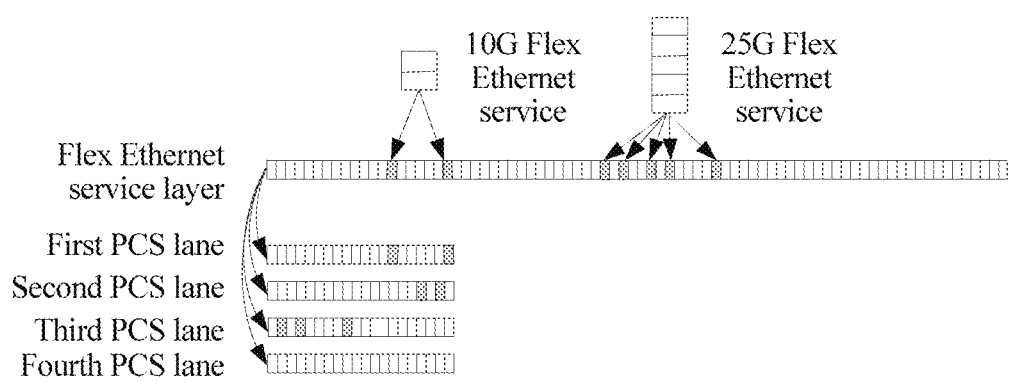
FIG. 2A is a schematic diagram of mapping a Flex Ethernet service into a Flex Ethernet service layer according to an embodiment of the present disclosure.

For example, FIG. 2A shows a schematic diagram of mapping a Flex Ethernet service into a Flex Ethernet service layer. If a bandwidth of the Flex Ethernet service is 10G, the receive end may divide the Flex Ethernet service into two data queues. Each data queue carries a queue identifier, and the queue identifier is used for data combination. Each data queue has a bandwidth of 5G The receive end may further insert the two data queues into a frame structure of the Flex Ethernet service layer, where each grid is corresponding to a 5G-timeslot; obtain a service layer overhead of the Flex Ethernet service layer; perform, according to the service layer overhead, timeslot allocation on a PCS that bears the Flex Ethernet service; and distribute the Flex Ethernet service to an allocated PCS timeslot by means of polling. The service layer overhead is periodic. The receive end may distribute the Flex Ethernet service to an allocated PCS timeslot between a first service layer overhead and a second service layer overhead. Alternatively, the receive end may distribute the Flex Ethernet service to an allocated PCS timeslot between a second service layer overhead and a third service layer overhead.

Further, the service layer overhead of the Flex Ethernet service layer is used to instruct to perform timeslot allocation on the PCS that bears the Flex Ethernet service. For example, FIG. 2B shows a schematic diagram of a format of a service layer overhead. #PHYs are used to indicate a quantity of PMD channels multiplexed by the Flex Ethernet service layer. This physical layer device (PHY) is used to indicate a PHY of the Flex Ethernet service layer. For example, the receive end determines, according to the #PHYs, that the Flex Ethernet service layer multiplexes PCS lanes of four 100GE PMD channels. After inserting, in a manner of 5G-timeslot, a 10G Flex Ethernet service into corresponding locations in a frame structure of the Flex Ethernet service layer, the receive end transmits the 10G Flex Ethernet service by using the 100GE PMD channels.

Figure 2C:
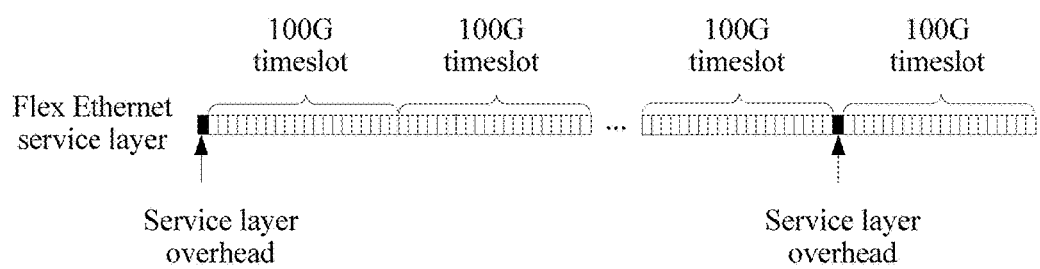
FIG. 2C is a schematic diagram of a location of a service layer overhead at a frame data stream of a Flex Ethernet service layer according to an embodiment of the present disclosure.
Figure 2E:
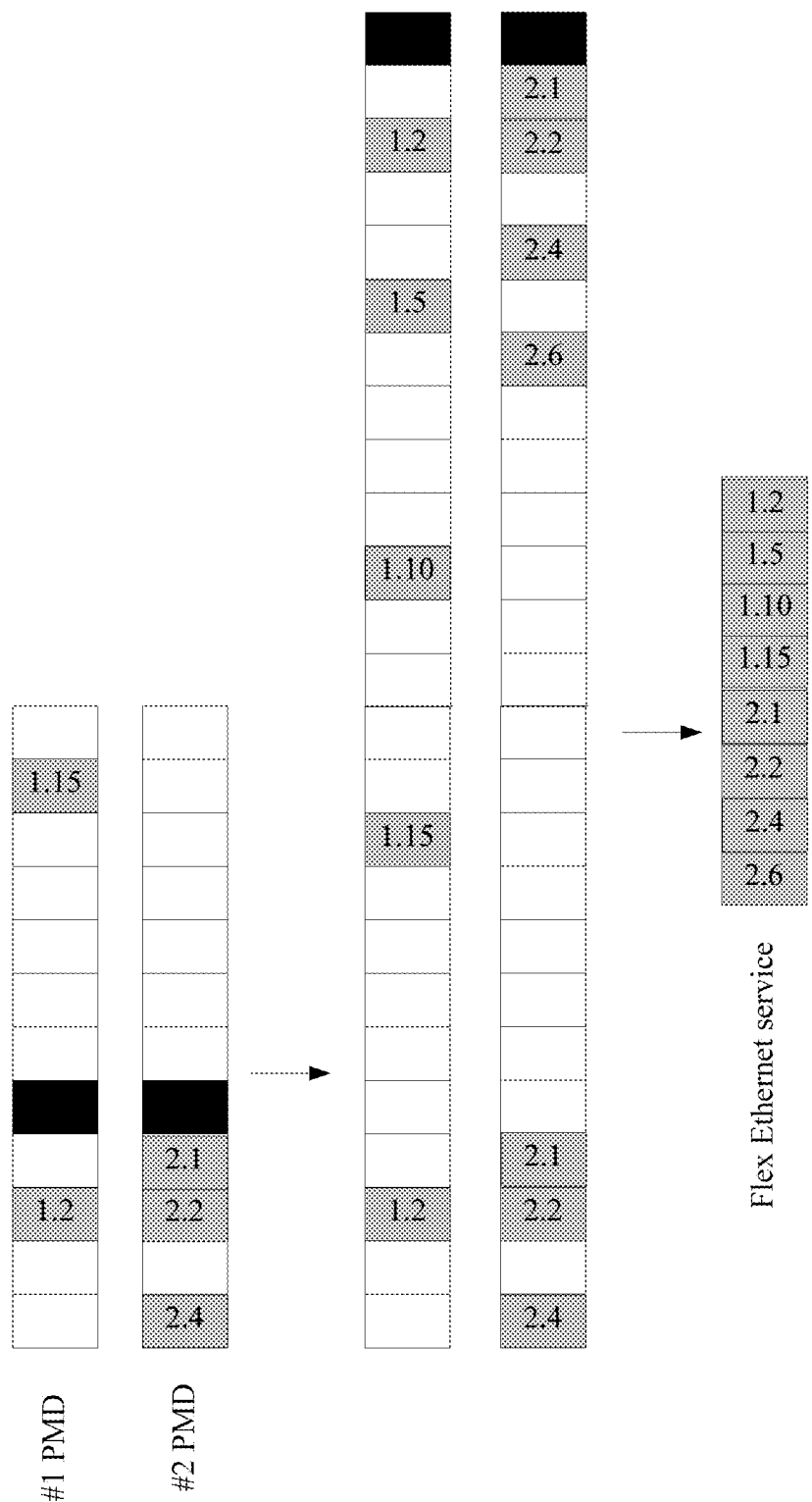
FIG. 2E is a schematic diagram of extracting a Flex Ethernet service from a Flex Ethernet service layer according to an embodiment of the present disclosure.

Further, a location of the service layer overhead at a frame data stream of the Flex Ethernet service layer may be shown in FIG. 2C. The receive end inserts a periodic service layer overhead into an interface, corresponding to the Flex Ethernet service layer, of each 100GE PMD. The Flex Ethernet service layer overhead is used to implement 5G-timeslot allocation.

Further, after distributing, according to the service layer overhead, the Flex Ethernet service to the allocated PCS timeslot by means of polling, the receive end divides the Flex Ethernet service into 20 logic channels in a 100GE PCS processing manner, and inserts an AM character at a specified location of each channel, where the AM character is used for internal delay alignment of the interfaces of the 100GE PMDs. For example, FIG. 2D shows a schematic diagram of a PCS timeslot into which an AM character is inserted. Each row is corresponding to a 5G-timeslot at each PCS lane. The AM character is used to indicate timeslot alignment of the 5G-timeslots within the 100GE PMD. It should be noted that, a location at which the AM character is inserted includes but is not limited to the foregoing location in this embodiment of the present disclosure. For example, the receive end may insert an AM character at a location of 1G-timeslot at each PCS lane, or the like. This embodiment of the present disclosure does not specifically impose any limitation.

S309, the receive end receives the Flex Ethernet service layer by using a Flex Ethernet interface.

According to the method for bearing a flexible Ethernet service on an OTN shown in FIG. 3, a transmit end extracts a Flex Ethernet service from a Flex Ethernet service layer; performs data division on the Flex Ethernet service to obtain at least two data queues; maps each data queue into an OTN container, where the OTN container includes an ODUk container or an ODUflex container; and sends the OTN containers to an OTN network. Further, a receive end obtains the OTN containers from the OTN network; obtains the data queues from the OTN containers; combines data on the data queues to obtain the Flex Ethernet service; maps the Flex Ethernet service into the Flex Ethernet service layer; and receives the Flex Ethernet service layer by using a Flex Ethernet interface. This can improve bandwidth utilization, and reduce network construction costs of an OTN.

Figure 4:
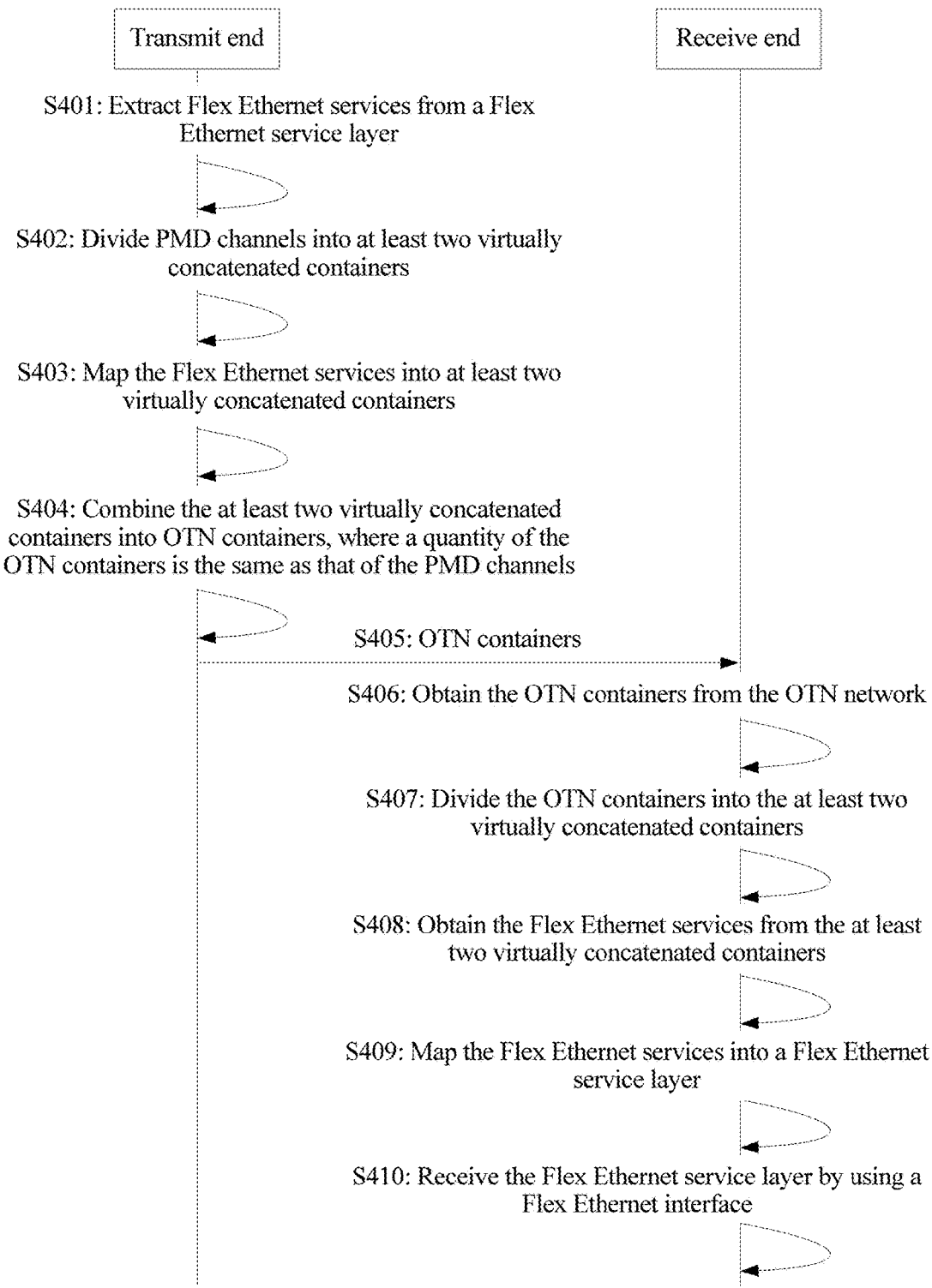
FIG. 4 is a schematic flowchart of a method for bearing a flexible Ethernet service on an OTN according to another embodiment of the present disclosure.

Referring to FIG. 4, FIG. 4 is a schematic flowchart of a method for bearing a flexible Ethernet service on an OTN according to an embodiment of the present disclosure. As shown in the figure, the method for bearing a flexible Ethernet service on an OTN in this embodiment of the present disclosure may include at least the following steps.

S401, a transmit end extracts Flex Ethernet services from a Flex Ethernet service layer.

S402, the transmit end divides PMD channels into at least two virtually concatenated containers.

In an optional embodiment, the transmit end may divide the PMD channels into at least two ODUk-Xv (X virtually concatenated ODUks, X virtually concatenated optical channel data unit-ks) containers in an OPUk-Xv (X virtually concatenated OPUks, X virtually concatenated optical channel payload unit-ks) manner. For example, there are two 400G PMD channels. The transmit end may divide each PMD channel into 80 5G virtually concatenated ODUk containers.

In an optional embodiment, the transmit end may divide the PMD channels into at least two X virtually concatenated ODUflexs, X virtually concatenated flexible optical channel data unit (ODUflex-Xv) containers in an X virtually concatenated OPUflexs, X virtually concatenated flexible optical channel data unit (OPUflex-Xv) manner. For example, there are two 400G PMD channels. The transmit end may divide the PMD channels into 80 5G virtually concatenated ODUflex containers.

In an optional embodiment, the transmit end may divide a PMD channel into at least two virtually concatenated containers. A quantity of the virtually concatenated containers is the same as that of Flex Ethernet services. For example, the Flex Ethernet service layer bears two 300G Flex Ethernet services and one 200G Flex Ethernet service. After extracting the Flex Ethernet services from the Flex Ethernet service layer, the transmit end may divide two 400G PMD channels into two 300G virtually concatenated containers and one 200G virtually concatenated container.

S403, the transmit end maps the Flex Ethernet services into the at least two virtually concatenated containers.

Figure 5:
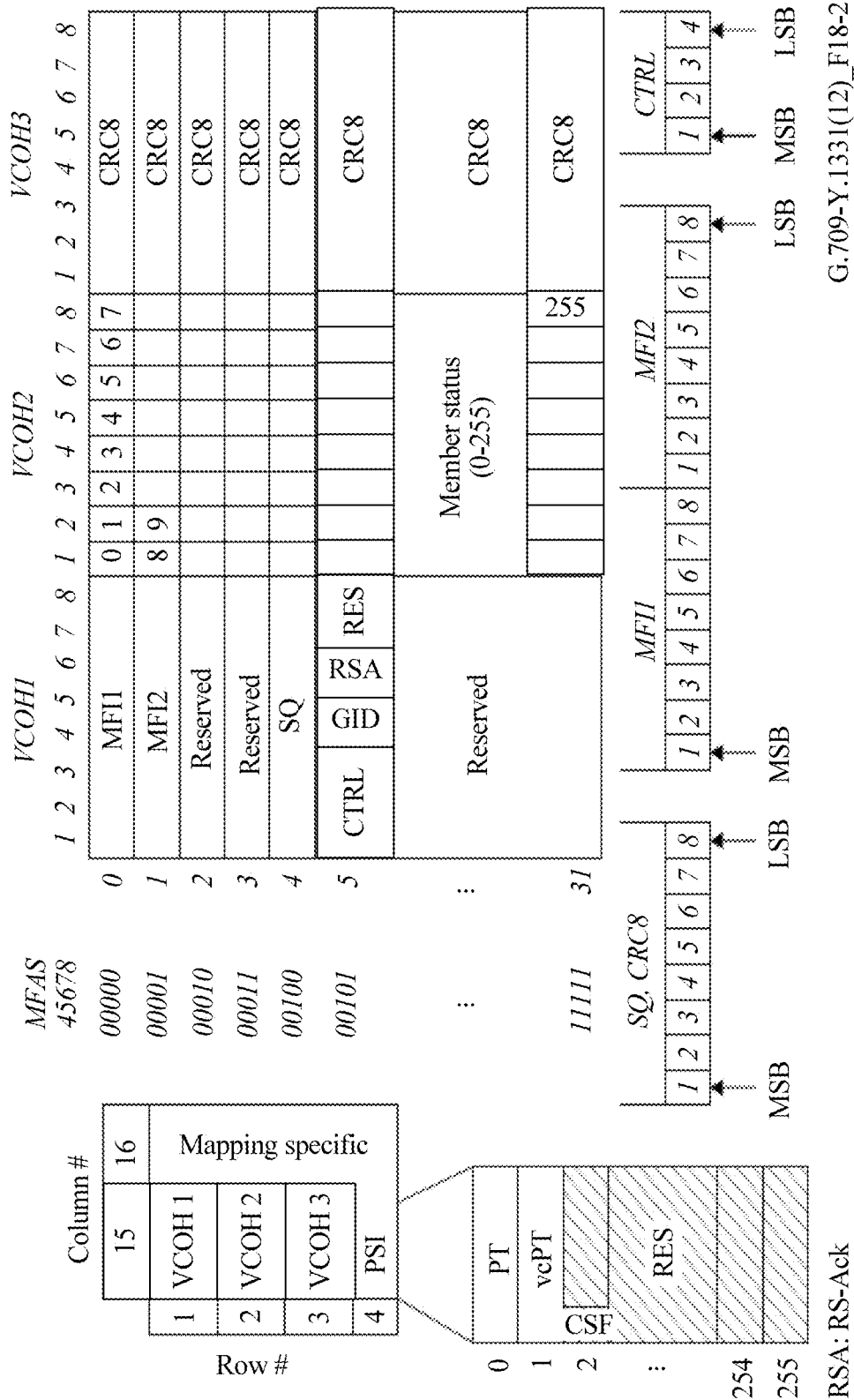
FIG. 5 is a schematic diagram of a format of a virtually concatenated overhead according to an embodiment of the present disclosure.

In an optional embodiment, after mapping the Flex Ethernet services into the at least two virtually concatenated containers, the transmit end may add a virtually concatenated overhead to each of the virtually concatenated containers. For example, FIG. 5 shows a schematic structural diagram of a virtually concatenated overhead. Virtually concatenated information is borne in a fifteenth column of an ODUflex frame structure. A rate of an ODUflex container may be n*289/238 (where n is a positive integer, and 239/238 is a factor for a rate from an OPUflex payload area to an OPUflex) times of a 5G-timeslot. Mapping is performed in a synchronization mapping manner. For a value of n, if n is 1, a maximum bandwidth of a Flex Ethernet service borne by the OPUflex-xV is 256*5G, which is approximately 1.28 T. If a Flex Ethernet service of a larger bandwidth may be required, for example, a bandwidth of the Flex Ethernet service is greater than 100G, an adjustment may be performed at a granularity of 50G. A value of n may be 1, 2, 5, 10, or the like, and the bandwidth of the Flex Ethernet service may be 1.28 T, 2.56 T, 6.4 T, 12.8 T, or the like. In this way, processing is simple, and bandwidth utilization and transmission efficiency can be improved.

S404, the transmit end combines the at least two virtually concatenated containers into OTN containers, where a quantity of the OTN containers is the same as that of the PMD channels.

S405, the transmit end sends the OTN containers to an OTN network.

S406, a receive end obtains the OTN containers from the OTN network.

S407, the receive end divides the OTN containers into the at least two virtually concatenated containers.

S408, the receive end obtains the Flex Ethernet services from the at least two virtually concatenated containers.

In specific implementation, when the virtually concatenated containers carry virtually concatenated overheads, the receive end may perform timeslot alignment on the virtually concatenated containers according to the virtually concatenated overheads. An MFI1, an MFI2, and an MFAS are used to instruct to perform timeslot alignment on the virtually concatenated containers. In this embodiment of the present disclosure, a delay difference between the virtually concatenated containers that is introduced in a transmission process can be eliminated by performing timeslot alignment on the virtually concatenated containers. In addition, an SQ is used to determine a location of each virtually concatenated container, and determine an arrangement sequence of data streams.

S409, the receive end maps the Flex Ethernet services into the Flex Ethernet service layer.

S410, the receive end receives the Flex Ethernet service layer by using a Flex Ethernet interface.

According to the method for bearing a flexible Ethernet service on an OTN shown in FIG. 4, a transmit end extracts Flex Ethernet services from a Flex Ethernet service layer; divides PMD channels into at least two virtually concatenated containers in an OPUk-Xv manner; maps the Flex Ethernet services into the at least two virtually concatenated containers; combines the at least two virtually concatenated containers into OTN containers, where a quantity of the OTN containers is the same as that of the PMD channels; and sends the OTN containers to an OTN. A receive end obtains the OTN containers from the OTN network; divides the OTN containers into the at least two virtually concatenated containers; obtains the Flex Ethernet services from the at least two virtually concatenated containers; maps the Flex Ethernet services into the Flex Ethernet service layer; and receives the Flex Ethernet service layer by using an Flex Ethernet interface. This can improve bandwidth utilization, and reduce network construction costs of an OTN.

Figure 6:
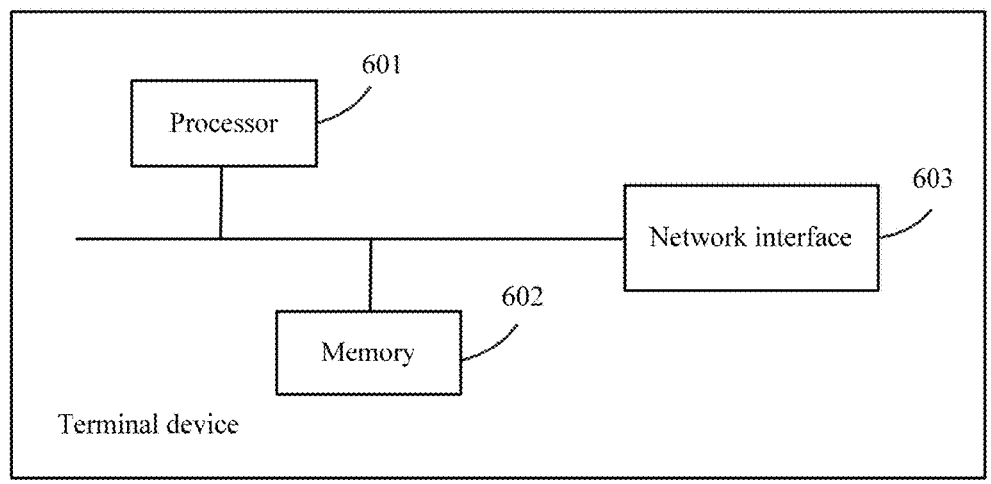
FIG. 6 is a schematic structural diagram of a terminal device according to an embodiment of the present disclosure.

Referring to FIG. 6, FIG. 6 is a schematic structural diagram of a terminal device according to an embodiment of the present disclosure. As shown in FIG. 6, the terminal device may include a processor 601, a memory 602, and a network interface 603. The processor 601 is connected to the memory 602 and the network interface 603. For example, the processor 601 may be connected to the memory 602 and the network interface 603 by using a bus.

The processor 601 may be a central processing unit (CPU), a network processor (NP), or the like.

The memory 602 may be configured to store a Flex Ethernet service and the like. The memory 602 may include a volatile memory, such as a random access memory (RAM); or the memory 602 may include a non-volatile memory, such as a read-only memory (ROM), a flash memory, a hard disk (HDD), or a solid state drive (SSD); or the memory 602 may include a combination of the memories of the foregoing types.

The network interface 603 is configured to communicate with a receive end, for example, send OTN containers to an OTN network. Optionally, the network interface 603 may include a standard wired interface, a wireless interface (for example, a Wi-Fi interface), and the like.

The terminal device described in this embodiment of the present disclosure can be configured to implement some or all of the processes in the embodiment of the method for bearing a flexible Ethernet service on an OTN that is described with reference to FIG. 3 in the present disclosure.

Figure 7:
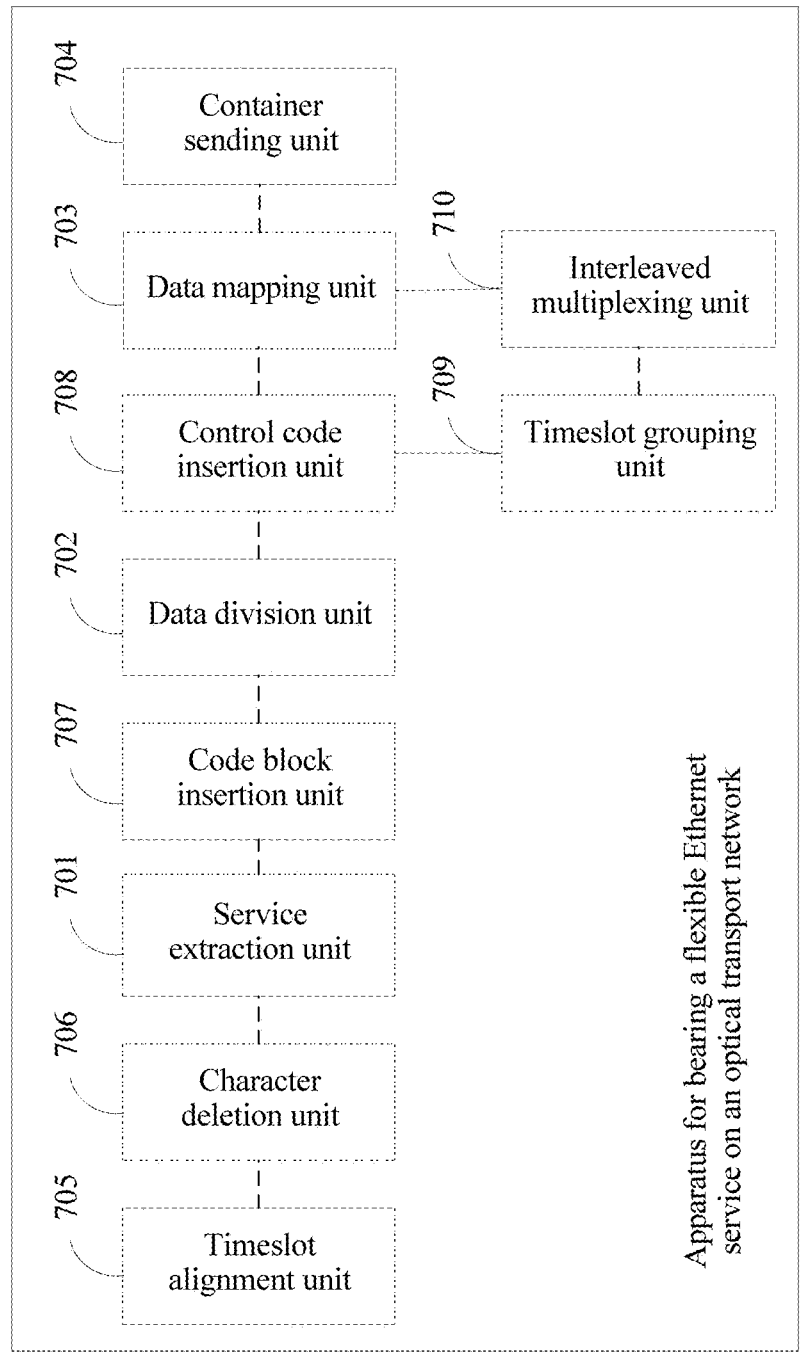
FIG. 7 is a schematic structural diagram of an apparatus for bearing a flexible Ethernet service on an OTN according to an embodiment of the present disclosure.

Referring to FIG. 7, FIG. 7 is a schematic structural diagram of an apparatus for bearing a flexible Ethernet service on an OTN according to an embodiment of the present disclosure. The apparatus for bearing a flexible Ethernet service on an OTN provided in this embodiment of the present disclosure may be combined with the processor 601 in FIG. 6. As shown in the figure, the apparatus for bearing a flexible Ethernet service on an OTN in this embodiment of the present disclosure may include at least a service extraction unit 701, a data division unit 702, a data mapping unit 703, and a container sending unit 704.

The service extraction unit 701 is configured to extract a Flex Ethernet service from a Flex Ethernet service layer.

The data division unit 702 is configured to perform data division on the Flex Ethernet service to obtain at least two data queues, where each data queue carries a queue identifier.

The data mapping unit 703 is configured to map each data queue into an OTN container.

The container sending unit 704 is configured to send the OTN containers to an OTN network.

In an optional embodiment, the service extraction unit 701 is configured to extract the Flex Ethernet service from the Flex Ethernet service layer according to timeslot distribution of the Flex Ethernet service at the Flex Ethernet service layer.

In an optional embodiment, the Flex Ethernet service layer is distributed to a PCS timeslot by means of polling. The apparatus for bearing a flexible Ethernet service on an OTN in this embodiment of the present disclosure may further include a timeslot alignment unit 705 configured to before the service extraction unit 701 extracts the Flex Ethernet service from the Flex Ethernet service layer, perform timeslot alignment on PCS timeslots according to AM characters in the PCS timeslots; and a character deletion unit 706 configured to delete the AM characters in the PCS timeslots to obtain the Flex Ethernet service layer.

Further, optionally, the character deletion unit 706 may be configured to delete the AM characters in the PCS timeslots;

perform, according to service layer overheads carried by the PCS timeslots, overhead alignment on the PCS timeslots whose AM characters are deleted; and extract the Flex Ethernet service from the PCS timeslots obtained by means of overhead alignment.

In an optional embodiment, the apparatus for bearing a flexible Ethernet service on an OTN in this embodiment of the present disclosure may further include a code block insertion unit 707 configured to after the service extraction unit 701 extracts the Flex Ethernet service from the Flex Ethernet service layer, insert an idle code block into the Flex Ethernet service every 20460 66B-code-blocks on average.

In an optional embodiment, the apparatus for bearing a flexible Ethernet service on an OTN in this embodiment of the present disclosure may further include a control code insertion unit 708 configured to after the data division unit 702 performs data division on the Flex Ethernet service to obtain the at least two data queues, insert a control code into each data queue every 16383 service data blocks, where the control code is used to instruct to perform timeslot alignment on the data queue.

In an optional embodiment, the apparatus for bearing a flexible Ethernet service on an OTN in this embodiment of the present disclosure may further include a timeslot grouping unit 709 configured to after the data division unit 702 performs data division on the Flex Ethernet service to obtain the at least two data queues, perform timeslot grouping on the at least two data queues to obtain at least one group of timeslot data queue; and an interleaving unit 710 configured to perform interleaving on each group of timeslot data queue.

The data mapping unit 703 is further configured to map each data stream obtained by means of interleaving into an OTN container.

Optionally, the timeslot grouping unit 709 is configured to after the control code insertion unit 708 inserts a control code into each data queue every 16383 service data blocks, perform timeslot grouping on at least two data queues to obtain at least one group of timeslot data queue.

The interleaving unit 710 is configured to perform interleaving on each group of timeslot data queue.

The data mapping unit 703 is further configured to map each group of timeslot data queue obtained by means of interleaving into an OTN container.

The apparatus for bearing a flexible Ethernet service on an OTN described in this embodiment of the present disclosure can be configured to implement some or all of the processes in the embodiment of the method for bearing a flexible Ethernet service on an OTN that is described with reference to FIG. 3 in the present disclosure.

Figure 8:
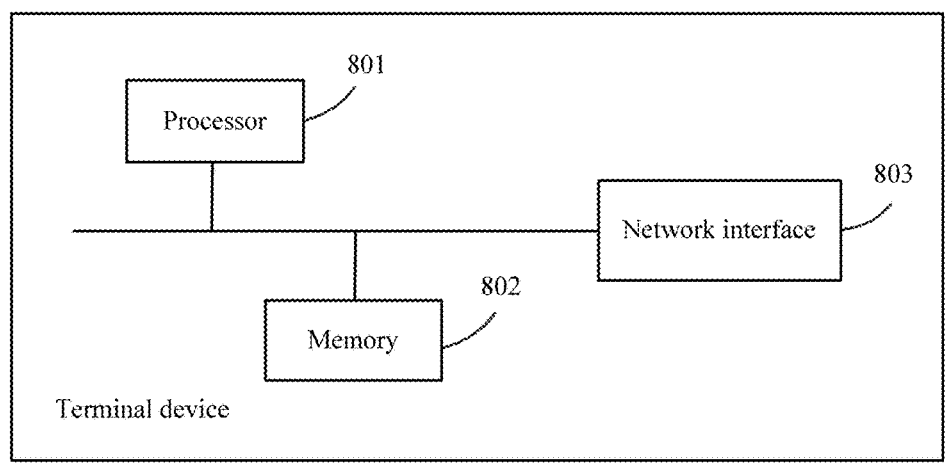
FIG. 8 is a schematic structural diagram of a terminal device according to another embodiment of the present disclosure.

Referring to FIG. 8, FIG. 8 is a schematic structural diagram of a terminal device according to an embodiment of the present disclosure. As shown in FIG. 8, the terminal device may include a processor 801, a memory 802, and a network interface 803. The processor 801 is connected to the memory 802 and the network interface 803. For example, the processor 801 may be connected to the memory 802 and the network interface 803 by using a bus.

The processor 801 may be a CPU, a NP, or the like.

The memory 802 may be configured to store a Flex Ethernet service and the like. The memory 802 may include a volatile memory, such as a RAM; or the memory 802 may include a non-volatile memory, such as a ROM, a flash memory, HDD, or SSD; or the memory 802 may include a combination of the memories of the foregoing types.

The network interface 803 is configured to communicate with a receive end, for example, send OTN containers to an OTN network. Optionally, the network interface 803 may include a standard wired interface, a wireless interface (for example, a Wi-Fi interface), and the like.

The terminal device described in this embodiment of the present disclosure can be configured to implement some or all of the processes in the embodiment of the method for bearing a flexible Ethernet service on an OTN that is described with reference to FIG. 4 in the present disclosure.

Figure 9:
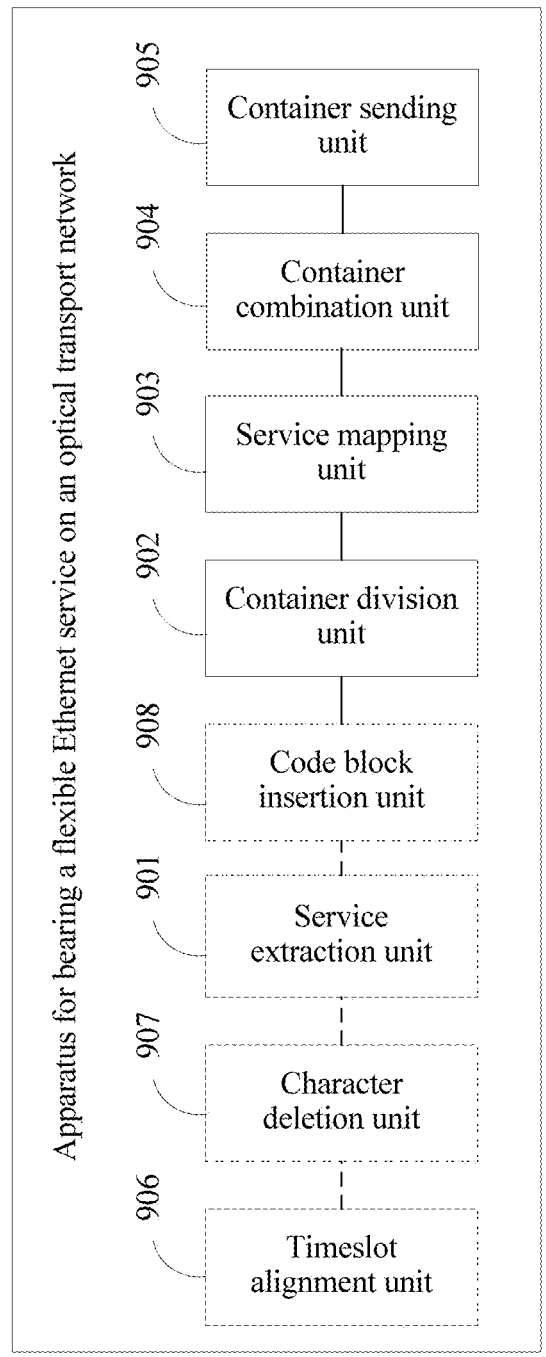
FIG. 9 is a schematic structural diagram of an apparatus for bearing a flexible Ethernet service on an OTN according to another embodiment of the present disclosure.

Referring to FIG. 9, FIG. 9 is a schematic structural diagram of an apparatus for bearing a flexible Ethernet service on an OTN according to an embodiment of the present disclosure. The apparatus for bearing a flexible Ethernet service on an OTN provided in this embodiment of the present disclosure may be combined with the processor 801 in FIG. 8. As shown in the figure, the apparatus for bearing a flexible Ethernet service on an OTN in this embodiment of the present disclosure may include at least a service extraction unit 901, a container division unit 902, a service mapping unit 903, a container combination unit 904, and a container sending unit 905.

The service extraction unit 901 is configured to extract Flex Ethernet services from a Flex Ethernet service layer.

The container division unit 902 is configured to divide PMD channels into at least two virtually concatenated containers.

The service mapping unit 903 is configured to map the Flex Ethernet services into the at least two virtually concatenated containers.

The container combination unit 904 is configured to combine the at least two virtually concatenated containers into OTN containers, where a quantity of the OTN containers is the same as that of the PMD channels.

The container sending unit 905 is configured to send the OTN containers to an OTN network.

In an optional embodiment, the service extraction unit 901 is configured to extract the Flex Ethernet services from the Flex Ethernet service layer according to timeslot distribution of the Flex Ethernet services at the Flex Ethernet service layer.

In an optional embodiment, the Flex Ethernet service layer is distributed to a PCS timeslot by means of polling. The apparatus for bearing a flexible Ethernet service on an OTN in this embodiment of the present disclosure may further include a timeslot alignment unit 906 configured to before the service extraction unit 901 extracts the Flex Ethernet services from the Flex Ethernet service layer, perform timeslot alignment on PCS timeslots according to AM characters in the PCS timeslots; and a character deletion unit 907 configured to delete the AM characters in the PCS timeslots to obtain the Flex Ethernet service layer.

Further, optionally, the character deletion unit 907 is configured to delete the AM characters in the PCS timeslots; perform, according to service layer overheads carried by the PCS timeslots, overhead alignment on the PCS timeslots whose AM characters are deleted; and extract the Flex Ethernet services from the PCS timeslots obtained by means of overhead alignment.

In an optional embodiment, the apparatus for bearing a flexible Ethernet service on an OTN in this embodiment of the present disclosure may further include a code block insertion unit 908 configured to after the service extraction unit 901 extracts the Flex Ethernet services from the Flex Ethernet service layer, insert an idle code block into the Flex Ethernet services every 20460 66B-code-blocks on average.

The apparatus for bearing a flexible Ethernet service on an OTN described in this embodiment of the present disclosure can be configured to implement some or all of the processes in the embodiment of the method for bearing a flexible Ethernet service on an OTN that is described with reference to FIG. 4 in the present disclosure.

Figure 10:
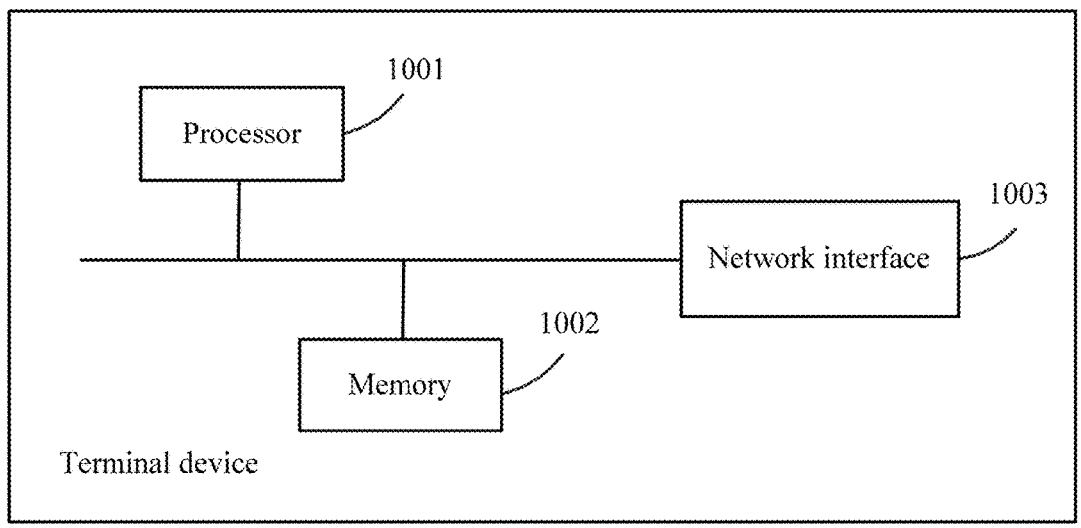
FIG. 10 is a schematic structural diagram of a terminal device according to another embodiment of the present disclosure.

Referring to FIG. 10, FIG. 10 is a schematic structural diagram of a terminal device according to an embodiment of the present disclosure. As shown in FIG. 10, the terminal device may include a processor 1001, a memory 1002, and a network interface 1003. The processor 1001 is connected to the memory 1002 and the network interface 1005. For example, the processor 1001 may be connected to the memory 1002 and the network interface 1005 by using a bus.

The processor 1001 may be a CPU or the like.

The memory 1002 may be configured to store a Flex Ethernet service and the like. The memory 1002 may include a volatile memory, such as a RAM; or the memory 1002 may include a non-volatile memory, such as a ROM, a flash memory, a HDD, or a SSD; or the memory 1002 may include a combination of the memories of the foregoing types.

The network interface 1003 is configured to communicate with a transmit end, for example, obtain OTN containers from an OTN. Optionally, the network interface 1003 may include a standard wired interface, a wireless interface (for example, a Wi-Fi interface), and the like.

The terminal device described in this embodiment of the present disclosure can be configured to implement some or all of the processes in the embodiment of the method for bearing a flexible Ethernet service on an OTN that is described with reference to FIG. 3 in the present disclosure.

Figure 11:
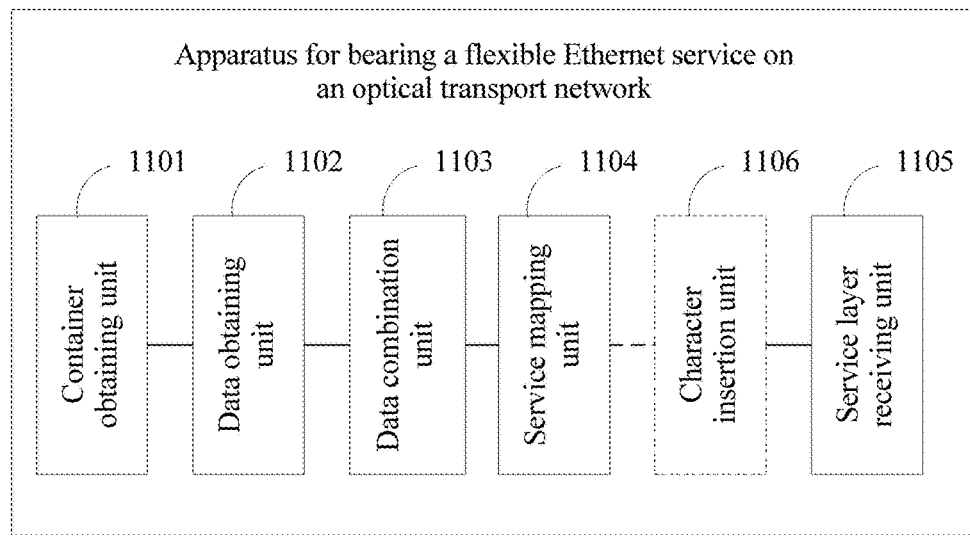
FIG. 11 is a schematic structural diagram of an apparatus for bearing a flexible Ethernet service on an OTN according to another embodiment of the present disclosure.

Referring to FIG. 11, FIG. 11 is a schematic structural diagram of an apparatus for bearing a flexible Ethernet service on an OTN according to an embodiment of the present disclosure. The apparatus for bearing a flexible Ethernet service on an OTN provided in this embodiment of the present disclosure may be combined with the processor 1001 in FIG. 10. As shown in the figure, the apparatus for bearing a flexible Ethernet service on an OTN in this embodiment of the present disclosure may include at least a container obtaining unit 1101, a data obtaining unit 1102, a data combination unit 1103, a service mapping unit 1104, and a service layer receiving unit 1105.

The container obtaining unit 1101 is configured to obtain OTN containers from an OTN network.

The data obtaining unit 1102 is configured to obtain data queues from the OTN containers, where each data queue carries a queue identifier.

The data combination unit 1103 is configured to combine data on the data queues according to the queue identifiers, to obtain a Flex Ethernet service.

The service mapping unit 1104 is configured to map the Flex Ethernet service into a Flex Ethernet service layer.

The service layer receiving unit 1105 is configured to receive the Flex Ethernet service layer by using a Flex Ethernet interface.

In an optional embodiment, the data obtaining unit 1102 is configured to obtain, from the OTN containers, timeslot data queues obtained by means of interleaving; perform de-interleaving on the timeslot data queues obtained by means of interleaving, to obtain data queues.

In an optional embodiment, the data queue carries a control code. The data obtaining unit 1102 in this embodiment of the present disclosure is configured to perform timeslot alignment on the data queues according to the control codes carried by the data queues, and delete control codes in the data queues to obtain the data queues.

In an optional embodiment, the service mapping unit 1104 is configured to obtain a service layer overhead at the Flex Ethernet service layer, where the service layer overhead is used to instruct to perform timeslot allocation on a PCS that bears the Flex Ethernet service; and distribute, according to the service layer overhead, the Flex Ethernet service to an allocated PCS timeslot by means of polling.

Further, optionally, the apparatus for bearing a flexible Ethernet service on an OTN in this embodiment of the present disclosure may further include a character insertion unit 1106 configured to after the service mapping unit 1104 distributes, according to the service layer overhead, the Flex Ethernet service to the allocated PCS timeslot by means of polling, insert an AM character at a specified location of each PCS timeslot, to perform timeslot alignment on the at least two PCS timeslots.

The apparatus for bearing a flexible Ethernet service on an OTN described in this embodiment of the present disclosure can be configured to implement some or all of the processes in the embodiment of the method for bearing a flexible Ethernet service on an OTN that is described with reference to FIG. 3 in the present disclosure.

Figure 12:
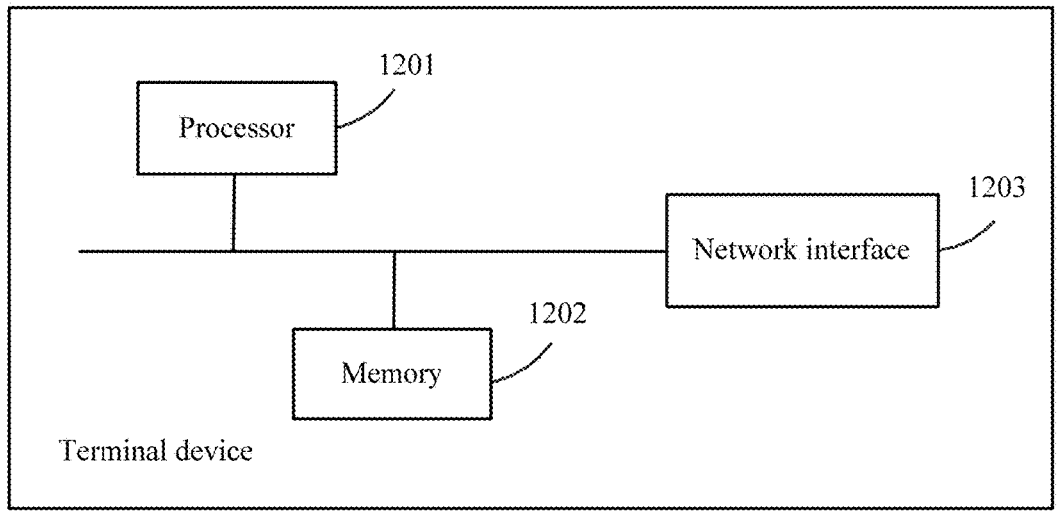
FIG. 12 is a schematic structural diagram of a terminal device according to another embodiment of the present disclosure.

Referring to FIG. 12, FIG. 12 is a schematic structural diagram of a terminal device according to an embodiment of the present disclosure. As shown in FIG. 12, the terminal device may include a processor 1201, a memory 1202, and a network interface 1203. The processor 1201 is connected to the memory 1202 and the network interface 1205. For example, the processor 1201 may be connected to the memory 1202 and the network interface 1205 by using a bus.

The processor 1201 may be a CPU or the like.

The memory 1202 may be configured to store a Flex Ethernet service and the like. The memory 1202 may include a volatile memory, such as a RAM; or the memory 1202 may include a non-volatile memory, such as a ROM, a flash memory, a HDD, or a SSD; or the memory 1202 may include a combination of the memories of the foregoing types.

The network interface 1203 is configured to communicate with a transmit end, for example, obtain OTN containers from an OTN. Optionally, the network interface 1203 may include a standard wired interface, a wireless interface (for example, a Wi-Fi interface), and the like.

The terminal device described in this embodiment of the present disclosure can be configured to implement some or all of the processes in the embodiment of the method for bearing a flexible Ethernet service on an OTN that is described with reference to FIG. 4 in the present disclosure.

Figure 13:
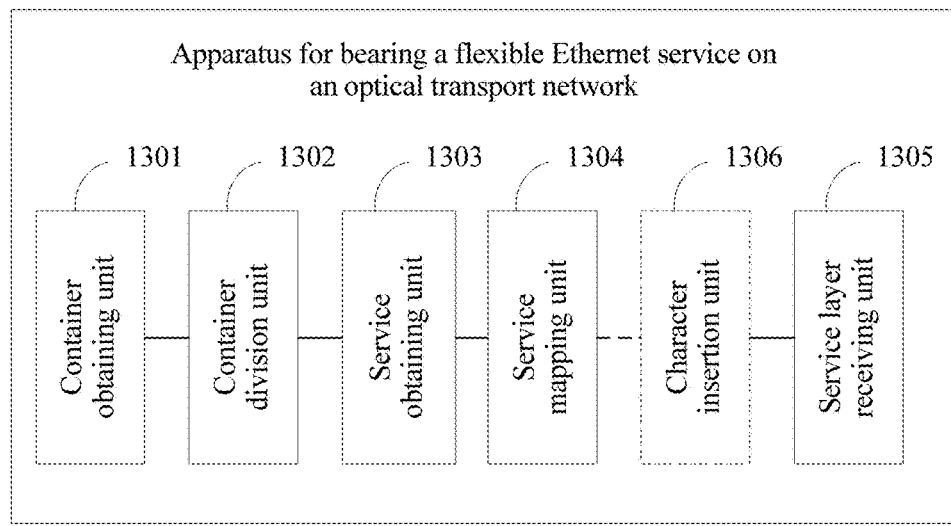
FIG. 13 is a schematic structural diagram of an apparatus for bearing a flexible Ethernet service on an OTN according to another embodiment of the present disclosure.

Referring to FIG. 13, FIG. 13 is a schematic structural diagram of an apparatus for bearing a flexible Ethernet service on an OTN according to an embodiment of the present disclosure. The apparatus for bearing a flexible Ethernet service on an OTN provided in this embodiment of the present disclosure may be combined with the processor 1201 in FIG. 12. As shown in the figure, the apparatus for bearing a flexible Ethernet service on an OTN in this embodiment of the present disclosure may include at least a container obtaining unit 1301, a container division unit 1302, a service obtaining unit 1303, a service mapping unit 1304, or a service layer receiving unit 1305.

The container obtaining unit 1301 is configured to obtain OTN containers from an OTN network.

The container division unit 1302 is configured to divide the OTN containers into at least two virtually concatenated containers.

The service obtaining unit 1303 is configured to obtain Flex Ethernet services from the at least two virtually concatenated containers.

The service mapping unit 1304 is configured to map the Flex Ethernet services into a Flex Ethernet service layer.

The service layer receiving unit 1305 is configured to receive the Flex Ethernet service layer by using a Flex Ethernet interface.

In an optional embodiment, the service mapping unit 1304 is configured to obtain a service layer overhead at the Flex Ethernet service layer, where the service layer overhead is used to instruct to perform timeslot allocation on a PCS that bears the Flex Ethernet service; and distribute, according to the service layer overhead, the Flex Ethernet services to an allocated PCS timeslot by means of polling.

In an optional embodiment, the apparatus for bearing a flexible Ethernet service on an OTN in this embodiment of the present disclosure may further include a character insertion unit 1306 configured to after the service mapping unit 1304 distributes, according to the service layer overhead, the Flex Ethernet services to the allocated PCS timeslot by means of polling, insert an AM character at a specified location of each PCS timeslot, to perform timeslot alignment on the at least two PCS timeslots.

The apparatus for bearing a flexible Ethernet service on an OTN described in this embodiment of the present disclosure can be configured to implement some or all of the processes in the embodiment of the method for bearing a flexible Ethernet service on an OTN that is described with reference to FIG. 4 in the present disclosure.

In the descriptions of this specification, reference terms "an embodiment", "some embodiments", "an example", "a specific example", "some examples", or the like mean that the specific features, structures, materials, or characteristics described with reference to the embodiments or examples are included in at least one embodiment or example of the present disclosure. In the specification, the foregoing illustrative expressions of the terms are not necessarily with respect to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in the specification, as long as they do not conflict each other.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include at least one of the features. In the descriptions of the present disclosure, "multiple" means at least two, such as, two, three, or more, unless there is a specific limitation.

Logic and/or steps shown in the flowcharts or described herein in other manners, for example, may be considered as a program list of executable instructions that are used to implement logic functions, and may be implemented on any computer-readable medium, for an instruction execution system, apparatus, or device (for example, a computer-based system, a system including a processor, or another system that can fetch instructions from the instruction execution system, apparatus, or device and execute the instructions) to use, or for a combination of the instruction execution system, apparatus, or device to use. In terms of the specification, the "computer-readable medium" may be any apparatus that may include, store, communicate, propagate, or transmit programs, for the instruction execution system, apparatus, or device to use, or for a combination of the instruction execution system, apparatus, or device to use. More specific examples (this list is not exhaustive) of the computer-readable medium include the following, an electrical portion (an electrical apparatus) with one or more buses, a portable computer cartridge (a magnetic apparatus), a RAM, a ROM, an electrically erasable programmable read-only memory (EEPROM), an optical fiber apparatus, and a compact disc read-only memory (CD-ROM). In addition, the computer-readable medium may even be a piece of paper on which the programs can be printed or another appropriate medium. Because, for example, optical scanning may be performed on the paper or the another medium, then processing, such as edition, decoding, or another appropriate means when necessary, may be performed to obtain the programs in an electrical manner, and then the programs are stored in a computer memory.

It should be understood that, parts in the present disclosure may be implemented by using hardware, software, firmware, or a combination thereof. In the foregoing implementation manners, multiple steps or methods may be implemented by using software or firmware that is stored in a memory and is executed by an appropriate instruction execution system. For example, if hardware is used for implementation, being similar to implementation in another implementation manner, any item or a combination of the following well-known technologies in the art may be used for implementation, a discreet logic circuit having a logic gate circuit that is used to implement a logic function for a data signal, an application-specific integrated circuit having an appropriate combinatorial logic circuit, a programmable gate array, a field programmable gate array, and the like.

The modules in the embodiments of the present disclosure may be implemented in a form of hardware, or may be implemented in a form of a software functional module. When the integrated module is implemented in the form of a software functional module and sold or used as an independent product, the integrated unit may be stored in a computer-readable storage medium.

Although the embodiments of the present disclosure are shown and described above, it can be understood that, the foregoing embodiments are examples, and cannot be construed as a limitation to the present disclosure. Within the scope of the present disclosure, a person of ordinary skill in the art may make changes, modifications, replacement, and variations to the foregoing embodiments.

What is claimed is:

1. A method for bearing a flexible Ethernet service on an optical transport network (OTN), the method comprising:
    obtaining a flexible Ethernet service layer that is distributed to a physical coding sublayer timeslot by means of polling, the flexible Ethernet service layer being obtained by:
        performing timeslot alignment on physical coding sublayer timeslots based on alignment marker (AM) characters in the physical coding sublayer timeslots; and
        deleting the AM characters in the physical coding sublayer timeslots;
    extracting a flexible Ethernet service from the flexible Ethernet service layer;
    performing data division on the flexible Ethernet service to obtain a plurality of data queues comprising a first data queue identified by a first queue identifier and a second data queue identified by a second queue identifier;

mapping the first data queue into a first OTN container and the second data queue into a second OTN container, wherein the first OTN container and the second OTN container comprise either an optical channel data unit-k (ODUk) container or an optical channel data unit flexible container; and sending the first OTN container and the second OTN container to an OTN.

2. The method of claim 1, wherein the extracting the flexible Ethernet service from the flexible Ethernet service layer comprises extracting the flexible Ethernet service from the flexible Ethernet service layer based on a timeslot distribution of the flexible Ethernet service at the flexible Ethernet service layer.

3. The method of claim 1, further comprising:
performing, based on service layer overheads carried by the physical coding sublayer timeslots, overhead alignment on the physical coding sublayer timeslots whose AM characters are deleted; and
extracting the flexible Ethernet service from the physical coding sublayer timeslots obtained by means of overhead alignment.

4. The method of claim 1, wherein after extracting the flexible Ethernet service from the flexible Ethernet service layer, the method further comprises inserting an idle code block into the flexible Ethernet service every 20460 66B-code-blocks on average.

5. The method of 1, wherein after performing data division on the flexible Ethernet service, the method further comprises inserting a control code into each of the first data queue and the second data queue every 16383 service data blocks, wherein the control code is used to instruct to perform timeslot alignment on the first data queue and the second data queue.

6. The method of claim 1, wherein after performing data division on the flexible Ethernet service, the method further comprises:
performing timeslot grouping on the plurality of data queues to obtain a plurality of groups of timeslot data queues;
performing interleaving on the plurality of groups of timeslot data queues to obtain a plurality of group data streams; and
mapping the plurality of group data streams to a plurality of OTN containers.

7. An apparatus for bearing a flexible Ethernet service on an optical transport network (OTN), the apparatus comprising:
a memory; and
a processor coupled to the memory, the processor configured to:
obtain a flexible Ethernet service layer that is distributed to a physical coding sublayer timeslot by means of polling, the flexible Ethernet service layer being obtained by:
performing timeslot alignment on physical coding sublayer timeslots based on alignment marker (AM) characters in the physical coding sublayer timeslots; and
deleting the AM characters in the physical coding sublayer timeslots;
extract a flexible Ethernet service from a flexible Ethernet service layer;

perform data division on the flexible Ethernet service to obtain a plurality of data queues comprising a first data queue and a second data queue, wherein the first data queue is identified by a first queue identifier and the second data queue is identified by a second queue identifier;
map the first data queue into a first OTN container and the second data queue into a second OTN container, wherein the first OTN container and the second OTN container comprise either an optical channel data unit-k (ODUk) container or an optical channel data unit flexible container; and
send the first OTN container and the second OTN container to an OTN.

8. The apparatus of claim 7, wherein the processor is further configured to extract the flexible Ethernet service from the flexible Ethernet service layer based on a timeslot distribution of the flexible Ethernet service at the flexible Ethernet service layer.

9. The apparatus of claim 7, wherein the processor is further configured to:
perform, based on service layer overheads carried by the physical coding sublayer timeslots, overhead alignment on the physical coding sublayer timeslots whose AM characters are deleted; and
extract the flexible Ethernet service from the physical coding sublayer timeslots obtained by means of overhead alignment.

10. The apparatus of claim 7, wherein the processor is further configured to after the processor extracts the flexible Ethernet service from the flexible Ethernet service layer, insert an idle code block into the flexible Ethernet service every 20460 66B-code-blocks on average.

11. The apparatus of claim 7, wherein the processor is further configured to after the processor performs data division on the flexible Ethernet service, insert a control code into each of the first data queue and the second data queue every 16383 service data blocks, wherein the control code is used to instruct to perform timeslot alignment on the first data queue and the second data queue.

12. The apparatus of claim 7, wherein the processor is further configured to:
perform timeslot grouping on the plurality of data queues to obtain a plurality of groups of timeslot data queues;
perform interleaving on the plurality of groups of timeslot data queues to obtain a plurality of group data streams; and
map the plurality of group data streams to a plurality of OTN containers.

13. An apparatus for bearing a flexible Ethernet service on an optical transport network (OTN), the apparatus comprising:
a memory;
and a processor coupled to the memory, the processor configured to:
obtain a flexible Ethernet service layer that is distributed to a physical coding sublayer timeslot by means of polling, the flexible Ethernet service layer being obtained by:
performing timeslot alignment on physical coding sublayer timeslots based on alignment marker (AM) characters in the physical coding sublayer timeslots; and
deleting the AM characters in the physical coding sublayer timeslots;
extract flexible Ethernet services from a flexible Ethernet service layer;

divide physical medium dependent (PMD) sublayer channels into a plurality of virtually concatenated containers, wherein the plurality of virtually concatenated containers comprise either an optical channel data unit-k (ODUk) virtually concatenated container or an optical channel data unit flexible virtually concatenated container;

map the flexible Ethernet services into the plurality of virtually concatenated containers;

combine the plurality of virtually concatenated containers into a plurality of OTN containers, wherein a quantity of the OTN containers is the same as a quantity of the PMD sublayer channels; and send the plurality of OTN containers to an OTN.

14. The apparatus claim 13, wherein the processor is further configured to extract the flexible Ethernet services from the flexible Ethernet service layer based on timeslot distribution of the flexible Ethernet services at the flexible Ethernet service layer.

15. The apparatus of claim 13, wherein the processor is further configured to:

perform, based on service layer overheads carried by the physical coding sublayer timeslots, overhead alignment on the physical coding sublayer timeslots whose AM characters are deleted; and extract the flexible Ethernet services from the physical coding sublayer timeslots obtained by means of overhead alignment.

16. The apparatus of claim 13, wherein the processor is further configured to after the service extraction unit extracts the flexible Ethernet services from the flexible Ethernet service layer, insert an idle code block into the flexible Ethernet services every 20460 66B-code-blocks on average.

* * * * *